(12) United States Patent
Linton et al.

(10) Patent No.: US 10,146,214 B2
(45) Date of Patent: Dec. 4, 2018

(54) METHOD AND SYSTEM FOR COLLECTING SUPPLY CHAIN PERFORMANCE INFORMATION

(71) Applicant: Flextronics AP, LLC, San Jose, CA (US)

(72) Inventors: Thomas K. Linton, Newnan, GA (US); Gary Fong, Cupertino, CA (US); Mark Whipple, Golden, CO (US); Marni Berger, Belmont, CA (US); Glenn Jones, Pleasanton, CA (US)

(73) Assignee: Flextronics AP, LLC, San Jose, CA (US)

( * ) Notice: Subject to any disclaimer, the term of this patent is extended or adjusted under 35 U.S.C. 154(b) by 558 days.

(21) Appl. No.: 13/935,114

(22) Filed: Jul. 3, 2013

(65) Prior Publication Data

US 2014/0018949 A1    Jan. 16, 2014

Related U.S. Application Data

(60) Provisional application No. 61/668,282, filed on Jul. 5, 2012, provisional application No. 61/716,960, filed
(Continued)

(51) Int. Cl.
*G05B 19/418* (2006.01)
*G06N 5/02* (2006.01)
(Continued)

(52) U.S. Cl.
CPC ..... *G05B 19/418* (2013.01); *G05B 19/41865* (2013.01); *G06F 17/30389* (2013.01);
(Continued)

(58) Field of Classification Search
None
See application file for complete search history.

(56) References Cited

U.S. PATENT DOCUMENTS

| 5,953,707 A | 9/1999 | Huang et al. |
| 6,151,582 A | 11/2000 | Huang et al. |

(Continued)

FOREIGN PATENT DOCUMENTS

| CN | 1691025 | 11/2005 |
| CN | 101291337 | 10/2008 |

(Continued)

OTHER PUBLICATIONS

U.S. Appl. No. 14/453,788, filed Aug. 7, 2014, McNamara et al.
(Continued)

*Primary Examiner* — Mohammad Ali
*Assistant Examiner* — Saad M Kabir
(74) *Attorney, Agent, or Firm* — Sheridan Ross P.C.

(57) ABSTRACT

According to one embedment, a supply chain monitoring system can collect performance information from a server associated with each of a tier 1 control tower, tier 2 product assembler, tier 3 part and/or component manufacturer, and tier 4 material supplier to monitor a performance of one or more functions of a supply chain. The system obtains event information regarding an event potentially adversely impacting performance of the supply chain, determines a range of disruption of the event indicating a likely spatial range impacted by the event, and compares the range of disruption of the event against the supply chain to determine that a supply chain component has been impacted by the event.

30 Claims, 15 Drawing Sheets

Related U.S. Application Data on Oct. 22, 2012, provisional application No. 61/750,184, filed on Jan. 8, 2013, provisional application No. 61/800,197, filed on Mar. 15, 2013.

(51) Int. Cl.
  *G06Q 10/06* (2012.01)
  *G06F 17/30* (2006.01)
(52) U.S. Cl.
  CPC ......... *G06N 5/02* (2013.01); *G06Q 10/06315* (2013.01); *Y02P 80/40* (2015.11)

(56) References Cited

U.S. PATENT DOCUMENTS

| | | | |
|---|---|---|---|
| 7,134,096 | B2 | 11/2006 | Brathwaite et al. |
| 7,171,379 | B2 | 1/2007 | Menninger et al. |
| 7,212,829 | B1 | 5/2007 | Lau et al. |
| 7,538,681 | B1 | 5/2009 | Sharma et al. |
| 7,712,058 | B2 | 5/2010 | Brathwaite et al. |
| 7,791,455 | B1 | 9/2010 | MacLean, III et al. |
| 7,809,377 | B1 | 10/2010 | Lau et al. |
| 7,809,456 | B2 | 10/2010 | Katircioglu |
| 7,895,131 | B2 | 2/2011 | Kraft |
| 8,061,607 | B1 | 11/2011 | Crossno et al. |
| 8,239,169 | B2 | 8/2012 | Gregory et al. |
| 8,299,920 | B2 | 10/2012 | Hamm et al. |
| 8,392,339 | B2 | 3/2013 | Kraft |
| D681,649 | S | 5/2013 | Fletcher et al. |
| D681,650 | S | 5/2013 | Fletcher et al. |
| D681,651 | S | 5/2013 | Fletcher et al. |
| D681,662 | S | 5/2013 | Fletcher et al. |
| D681,670 | S | 5/2013 | Fletcher et al. |
| 8,502,672 | B1 | 8/2013 | Crossno |
| 8,515,804 | B2 | 8/2013 | Brennan |
| 8,560,274 | B2 | 10/2013 | Gregory et al. |
| 8,725,165 | B2 | 5/2014 | Lau et al. |
| 8,766,797 | B2 | 7/2014 | Hamm et al. |
| 8,786,437 | B2 | 7/2014 | Breed |
| 8,838,095 | B2 | 9/2014 | Jouin |
| 8,886,216 | B1 | 11/2014 | Crossno et al. |
| 9,002,679 | B2 | 4/2015 | Gregory et al. |
| 9,020,536 | B1 | 4/2015 | Crossno et al. |
| 9,095,001 | B2 | 7/2015 | Lemmon et al. |
| 9,194,932 | B2 | 11/2015 | Lee et al. |
| 2002/0091536 | A1 | 7/2002 | Seaman et al. |
| 2002/0099578 | A1 | 7/2002 | Eicher, Jr. et al. |
| 2002/0099598 | A1 | 7/2002 | Eicher, Jr. et al. |
| 2002/0138316 | A1 | 9/2002 | Katz et al. |
| 2002/0138324 | A1* | 9/2002 | Zarefoss ............... G06Q 10/06 705/7.21 |
| 2002/0161674 | A1 | 10/2002 | Scheer |
| 2002/0174000 | A1 | 11/2002 | Katz et al. |
| 2002/0178077 | A1 | 11/2002 | Katz et al. |
| 2002/0188496 | A1 | 12/2002 | Feldman et al. |
| 2003/0014287 | A1 | 1/2003 | Williams et al. |
| 2003/0018490 | A1 | 1/2003 | Magers et al. |
| 2003/0033179 | A1 | 2/2003 | Katz et al. |
| 2003/0172008 | A1 | 9/2003 | Hage et al. |
| 2003/0225651 | A1 | 12/2003 | Chen |
| 2004/0117358 | A1* | 6/2004 | von Kaenel ...... G06F 17/30241 |
| 2004/0148217 | A1 | 7/2004 | Lauring et al. |
| 2004/0260703 | A1 | 12/2004 | Elkins et al. |
| 2005/0015265 | A1 | 1/2005 | Price |
| 2005/0149377 | A1 | 7/2005 | Schierholt |
| 2006/0055163 | A1 | 3/2006 | Cho |
| 2006/0085323 | A1 | 4/2006 | Matty et al. |
| 2006/0100912 | A1 | 5/2006 | Kumar et al. |
| 2007/0203770 | A1 | 8/2007 | Grosvenor et al. |
| 2007/0287438 | A1 | 12/2007 | Hansen et al. |
| 2008/0062044 | A1 | 3/2008 | Al-Mandawi |
| 2008/0172262 | A1 | 7/2008 | An et al. |
| 2010/0125486 | A1 | 5/2010 | Sinclair et al. |
| 2010/0194560 | A1* | 8/2010 | Hojecki ................ G06Q 10/06 340/540 |
| 2010/0198631 | A1 | 8/2010 | Edwards et al. |
| 2011/0302171 | A1 | 12/2011 | Waldo et al. |
| 2011/0307292 | A1 | 12/2011 | Waldo et al. |
| 2012/0197686 | A1 | 8/2012 | Abu El Ata |
| 2012/0254345 | A1 | 10/2012 | Montoya |
| 2012/0306646 | A1 | 12/2012 | Walker et al. |
| 2013/0080200 | A1 | 3/2013 | Connolly et al. |
| 2014/0018950 | A1 | 1/2014 | Linton et al. |
| 2014/0019189 | A1 | 1/2014 | Linton |
| 2014/0019471 | A1 | 1/2014 | Linton et al. |
| 2014/0048951 | A1 | 2/2014 | Linton et al. |
| 2014/0065948 | A1 | 3/2014 | Huang |
| 2014/0132478 | A1 | 5/2014 | Wang et al. |
| 2015/0177810 | A1 | 6/2015 | Gregory et al. |
| 2016/0054448 | A1 | 2/2016 | Woolf et al. |
| 2017/0344939 | A1 | 11/2017 | Linton et al. |

FOREIGN PATENT DOCUMENTS

| | | |
|---|---|---|
| CN | 201311674 | 9/2009 |
| EP | 2216917 | 8/2010 |
| WO | WO 2001/75700 | 10/2001 |
| WO | WO 2006/083752 | 8/2006 |
| WO | WO 2011/025987 | 3/2011 |

OTHER PUBLICATIONS

International Preliminary Report on Patentability for International (PCT) Patent Application No. PCT/US13/49304, dated Jan. 15, 2015 10 pages.
Official Action for U.S. Appl. No. 13/935,209, dated Mar. 17, 2015 17 pages.
"Supply Risk Solutions Awarded Patent for Multi-Tier Supply Risk Management," PRWeb, Sep. 5, 2013, 3 pages.
International Search Report and Written Opinion for International (PCT) Patent Application No. PCT/US13/49304, dated Mar. 21, 2014 14 pages.
European Extended Search Report for European Patent Application No. 13812608.1, dated May 21, 2015, 7 pages.
Office Action for European Patent Application No. 13812608.1, dated May 22, 2016, 4 pages.
Official Action for U.S. Appl. No. 13/935,198, dated Sep. 26, 2016, 34 pages.
Final Action for U.S. Appl. No. 13/935,198, dated Mar. 8, 2017, 24 pages.
Official Action for U.S. Appl. No. 13/935,198, dated Jun. 27, 2017, 28 pages.
Official Action for U.S. Appl. No. 13/935,224, dated Jul. 2, 2015, 15 pages.
Final Action for U.S. Appl. No. 13/935,224, dated Feb. 9, 2016, 29 pages.
Official Action for U.S. Appl. No. 13/935,224, dated Jan. 13, 2017, 32 pages.
Final Action for U.S. Appl. No. 13/935,224, dated Jul. 18, 2017, 39 pages.
Official Action for U.S. Appl. No. 13/935,198, dated Feb. 21, 2018, 31 pages.
Official Action (with English translation) for Chinese Patent Application No. 201380034915.8, dated Oct. 27, 2016, 12 pages.
Official Action (with English translation) for Chinese Patent Application No. 201380034915.8, dated May 15, 2017, 4 pages.
Decision to Grant (with English translation) for Chinese Patent Application No. 201380034915.8, dated Sep. 4, 2017, 4 pages.
"Cold Chain Shipping: Protecting Temperature Sensitive Products," GPS International Technologies, Inc., 2014, retrieved from https://web.archive.org/web/20140422224603/http://www.gpsit.com/asset-tracking/industry-solutions/cold-chain-shipping.html, 3 pages.
"Digital Transformation of Industries: In collaboration with Accenture," World Economic Forum White Paper, 2016, pp. 31 pages.
"FedEx Expands SenseAwares Availability to International Markets; Adds New Capabilities to Provide Customers with Greater Flexibility and Reach," FedEx, 2012, retrieved from https://about.van.fedex.com/newsroom/senseaware-expands-availability-to-international-markets/, 3 pages.

(56) References Cited

OTHER PUBLICATIONS

"ILC2000 Cargo Monitoring and Tracking Device," Moog Crossbow, 2016, retrieved from https://web.archive.org/web/20160119002920/http://www.moog-crossbow.com/asset-tracking/products-services/ilc3000/, 3 pages.

"ILC2000 Cargo Monitoring and Tracking Device," Moog Crossbow, 2016, retrieved from https://web.archive.org/web/20160119082804/http://www.moog-crossbow.com/asset-tracking/products-services/ilc2000/, 3 pages.

"Moog Crossbow Asset-Tracking," Moog Crossbow, 2016, retrieved from https://web.archive.org/web/20160119071955/http://www.moog-crossbow.com:80/asset-tracking/, 2 pages.

"Moog Crossbow GeoView," Moog Crossbow, 2016, retrieved from https://web.archive.org/web/20160119082934/http://www.moog-crossbow.com:80/asset-tracking/products-services/geoview/, 2 pages.

"Moog Crossbow Markets," Moog Crossbow, 2016, retrieved from https://web.archive.org/web/20160118193917/http://www.moog-crossbow.com/asset-tracking/markets/, 3 pages.

"PT300 Package Tracker," GPS International Technologies, Inc., 2014, retrieved from https://web.archive.org/web/20141224223438/http://www.gpsit.com/gps-tracking-system/gps-trackers/pt300-package-tracker.html, 4 pages.

"PT300 Tracking System," Sendum Wireless Corporation, 2014, retrieved from http://sendum.com/pt300-package-tracker/, 11 pages.

"SenseAware PT300D," FedEx, 2016, 1 page.

"SenseAware, What Is Sensor-Based Logistics," FedEx, 2015, retrieved from https://web.archive.org/web/20151007214612/http://www.senseaware.com/what-is-sensor-based-logistics/, 1 page.

"SenseAware," FedEx, 2014, 2 pages.

"SENTRY 500," OnAsset Intelligence, 2016, retrieved from https://web.archive.org/web/20160116142643/http://www.onasset.com/sentry.html, 2 pages.

"The Kizy online tracking platform," Kizy Global Tracking, 2016, 2 pages.

"Trackinapacktm GPS Tracking Devices," Global Tracking Technologies Ltd., 2016, retrieved from https://web.archive.org/web/20160117002814/http://www.trackinapack.co.uk/gpstrackingdevices, 6 pages.

"What Kizy can do for you," Kizy Global Tracking, 2016, retrieved from http://www.kizytracking.com/en/customers, retrieved on Apr. 13, 2016, 4 pages.

Steiner, "FedEx innovation exec shares slides, story behind SenseAware service," Innovation Leader, https://www.innovationleader.com/fedex-innovation-exec-shares-slides-story-behind-senseaware-service/, 5 pages.

Final Action for U.S. Appl. No. 13/935,198, dated Nov. 1, 2017, 30 pages.

* cited by examiner

FIG. 13

METHOD AND SYSTEM FOR COLLECTING SUPPLY CHAIN PERFORMANCE INFORMATION

CROSS REFERENCE TO RELATED APPLICATION

The present application claims the benefits of U.S. Provisional Application Ser. Nos. 61/668,282, filed Jul. 5, 2012; 61/716,960, filed Oct. 22, 2012, and 61/750,184, filed Jan. 8, 2013, all entitled "Method and System for Controlling Supply Chains", and 61/800,197, filed Mar. 15, 2013, entitled "Method and System for Managing Supply Chains", each of which is incorporated herein by this reference in its entirety.

FIELD

The disclosure relates generally to automated systems for product management and particularly to automated systems for controlling and/or managing supply chains.

BACKGROUND

The traditional structure of the business supply chain, which viewed supply chain management as a chain of events, is evolving, in response to the ever-complicated logistics of modern trade, commerce and communications, towards viewing supply chain management as a three-dimensional model. In other words, organizations no longer view supply networks as a linear relationship between raw materials and distributors. Rather, today's supply web resembles a three-dimensional construct, complete with a variety of suppliers, tiers and intermediaries that serve to fill in for one another in the event of a disruption.

Increasingly, how well a supply web creates and shares information not only defines how well the web holds together, how efficiently it operates, and how much value it adds but also determines the success or failure—as a group—of the manufacturing venture. Companies need to share supply metrics, timelines, demand and capacity data to enable the supply network to develop a common and aligned set of objectives, which can protect it against commodity pressures, volatility and individual failures. Sharing information can speed up supply chains while mitigating the inherent risks in doing so. This new model, with cost management at its core, can capture decades of best practices in a unified strategy for a new generation of companies and managers.

Essential to the practices of supply chains is the establishment of material control through a combination of material control towers that dictate, to suppliers, price, terms, and supply requirements.

Although significant advances have been made towards establishing a three-dimensional supply chain by companies such as E2Open™, GT Nexus™, and Resilinc™, problems remain. Many three-dimensional supply chains are fairly rigid and unable to respond dynamically to, let alone anticipate, adverse events. This can cause disruption in the supply chain and concomitant interruptions in the product distribution chain.

SUMMARY

These and other needs are addressed by the various aspects, embodiments, and/or configurations of the present disclosure. The present disclosure discloses a supply chain management system that can estimate manufactured item delivery times at a facility, manufactured item costs or prices, and dynamically control supply chain performance.

In a supply chain comprising a tier 1 control tower, tier 2 product assembler, tier 3 part and/or component manufacturer, and tier 4 material supplier, each of the tier 1 control tower, tier 2 product assembler, tier 3 part and/or component manufacturer, and tier 4 material supplier, the tier 1 control tower, tier 2 product assembler, tier 3 part and/or component manufacturer, and tier 4 material supplier, each of the tier 1 control tower, tier 2 product assembler, tier 3 part and/or component manufacturer, and tier 4 material supplier being associated with a different and independent enterprise and/or organization, a supply chain monitoring system can include a microprocessor executable data collection module, method, and instructions to collect performance information from a server associated with each of the tier 1 control tower, tier 2 product assembler, tier 3 part and/or component manufacturer, and tier 4 material supplier to monitor a performance of one or more functions of the supply chain.

The performance information can include a plurality of manufactured item output projections over a specified time period, production facility sizes and/or locations, raw material, work-in-process, manufactured part and/or component and/or product inventory levels, order cycle times, days of supply in inventory, manufacturing resource type, availability, reliability, and/or productivity, unit operations, financial factors, number of on time shipments, number of late shipments, order mismatch count, service quality, repair cost per unit, inventory value, transaction documents associated with a material and/or part and/or component and/or product of one or more of the tier 1 control tower, tier 2 product assembler, tier 3 part and/or component manufacturer, and tier 4 material supplier, historic, current, and/or projected compliance with price, supply requirements, and/or other material terms, historic, current, and/or projected material and/or part and/or component and/or product output levels, and mean, median, average, mode, historic, and/or projected freight transportation times, delays, and/or requirements.

Data structures for the collected performance information can describe a role for each enterprise and/or organization associated with the tier 1 control tower, tier 2 product assembler, tier 3 part and/or component manufacturer, and tier 4 material supplier and one or more associated enterprises and/or organizations in the supply chain to indicate a contractual or other supply relationship.

The data structures can also describe a geographical and/or geopolitical location of each enterprise and/or organization associated with the tier 1 control tower, tier 2 product assembler, tier 3 part and/or component manufacturer, and tier 4 material supplier, material and/or part and/or component and/or product type and/or identity supplied by the enterprise and/or organization, current spot market and/or contractual sales price of the material and/or part and/or component and/or product type supplied by the enterprise and/or organization, respective performance metrics of the enterprise and/or organization, material and/or part and/or component and/or product supply and/or purchase commitment with another enterprise and/or organization in the supply chain, specifications and requirements for material(s) and/or part(s) and/or component(s) and/or product(s) supplied and/or purchased by the enterprise and/or organization, material and/or part and/or component and/or product quantity and shipment dates and expected arrival dates at the next enterprise and/or organization in the supply chain, order cycle and/or turnaround times, shipment and/or order volume, total number of shipments, number of on time shipments, number of late shipments, and/or order mismatch count.

Shipment information can be collected from one or more servers associated with a freight enterprise and/or organization handling a shipment between enterprises and/or organizations in the supply chain.

Event information regarding events potentially adversely impacting performance of the supply chain can be collected from a server associated with one or more of a news source, a news aggregator, a weather data source, a governmental entity, a law enforcement authority, and a military authority.

The supply chain monitoring system can include a microprocessor executable scheduling module, method, and/or instructions to provide scheduling information for a selected shipment, including a projected shipment arrival date and/or required shipment departure date, the scheduling information being linked to a set of data structures describing the shipment, the set of data structures comprising one or more of shipment source and/or destination, freight carrier, freight tracking information, current shipment status, shipment contents, and date of shipment.

The supply chain monitoring system can include a microprocessor executable historical state module, method, and/or instructions to maintain historical information tracking past performance for a plurality of the tier 1 control tower, tier 2 product assembler, tier 3 part and/or component manufacturer, and tier 4 material supplier and, based on the past performance, assign a level of confidence in a shipment arriving by a selected date.

The supply chain monitoring system can include a microprocessor executable analytical module, method, and/or instructions to receive collected performance information, scheduling information, and historical information and identify a current and/or potential noncompliant event in the supply chain.

The analytical module, method, and/or instructions can determine and assign a supply chain performance rating for each of the tier 2 product assembler, tier 3 part and/or component manufacturer, and tier 4 material supplier and a likelihood that the noncompliant event will occur.

The supply chain monitoring system can include a microprocessor executable risk manager, method, and/or instructions to apply a rule, policy, and/or template to the performance information and provide and/or implement one or more mitigation recommendations to mitigate a noncompliant event.

The supply chain monitoring system can include a reporting module, method, and/or instructions to generate a map display presenting collected performance information to an administrator, the map display comprising a location for each of the tier 2 product assembler, tier 3 part and/or component manufacturer, and tier 4 material supplier and a shipment route for each of the tier 2 product assembler, tier 3 part and/or component manufacturer, and tier 4 material supplier and wherein at least one of the location and shipment route comprise a compliance indicator indicating whether the corresponding at least one of the location and shipment route is in compliance with a supply chain performance objective and/or requirement.

The supply chain monitoring system can perform one or more of the following tasks, functions, and/or operations:

(a) Track historic performance of a supply chain;

(b) Anticipate and/or quickly identify potentially disruptive event(s) and mitigate the adverse impact of the potentially disruptive event(s) on the supply chain;

(c) Analyze supply chains to identify cost inefficiencies, bottlenecks, and unnecessary performance delays;

(d) Recommend and/or implement solutions for the identified cost inefficiencies, bottlenecks, and unnecessary performance delays;

(e) Monitor the performance of a supply chain in light of distribution chain requirements or objectives to identify potential violations or shortfalls; and (f) Recommend and/or implement solutions to avoid or mitigate the identified potential violations or shortfalls.

All or parts of the supply chain management system can be executed on one or more computers and typically is stored as microprocessor executable instructions on a computer readable medium.

The present disclosure can provide a number of advantages depending on the particular aspect, embodiment, and/or configuration. The supply chain management system can, particularly for vertically integrated supply chains, more effectively and efficiently control suppliers, prices, product supply, and other terms, generate faster material turns or velocities, increase profit, enable leaner manufacturing and logistics operations, and reduce waste when compared to a supply chain without the supply chain management system. It can more effectively consider the impact of unanticipated or "black swan" events, including natural and manmade disasters, by monitoring news sources, law enforcement and military authorities, among others, and precisely mapping tier 1, 2, 3, and 4 facilities. It can effectively assess the sensitivity of the supply chain to various internal and external events. It can assess the risk of having a particular product or product component available at a selected location at a selected price or cost. It can enable greater levels of collaboration not only among the various tiers but also within tiers. It can enable more effective management of multiple sources, within a given tier, even for legally distinct, competitive entities. The system's combination of cloud tools, operating models, and risk management logic can create new, more profitable and effective business practices in three-dimensional supply chains.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Advanced planning and scheduling" (also referred to as APS and advanced manufacturing) refers to a manufacturing management process by which raw materials and production capacity are substantially optimally allocated to meet demand. APS is especially well-suited to environments where simpler planning methods cannot adequately address complex trade-offs between competing priorities. Production scheduling can be very difficult due to the (approximately) factorial dependence of the size of the solution space on the number of items/products to be manufactured.

"Automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Computer-readable medium" as used herein refers to any tangible and non-transient storage and/or transmission medium that participate in providing instructions to a processor for execution. Such a medium may take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium excludes transient storage media, particularly electrical, magnetic, electromagnetic, optical, magneto-optical signals.

"Critical path method" refers to an algorithm for scheduling a set of project activities. CPM constructs a model of the project that includes the following: (a) a list of all activities required to complete the project (typically categorized within a work breakdown structure), (b) the time (duration) that each activity will take to completion, and (c) the dependencies between the activities. Using these values, CPM calculates the longest path of planned activities to the end of the project, and the earliest and latest that each activity can start and finish without making the project longer. This process determines which activities are "critical" (i.e., on the longest path) and which have "total float" (i.e., can be delayed without making the project longer). In project management, a critical path is the sequence of project network activities which add up to the longest overall duration. This determines the shortest time possible to complete the project. Any delay of an activity on the critical path directly impacts the planned project completion date (i.e. there is no float on the critical path). A project can have several, parallel, near critical paths. An additional parallel path through the network with the total durations shorter than the critical path is called a sub-critical or non-critical path.

A "database" is an organized collection of data held in a computer. The data is typically organized to model relevant aspects of reality (for example, the availability of specific types of inventory), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multivalue, semantic, and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented, and unstructured databases.

"Database management systems" (DBMSs) are specially designed applications that interact with the user, other applications, and the database itself to capture and analyze data. A general-purpose database management system (DBMS) is a software system designed to allow the definition, creation, querying, update, and administration of databases. Well-known DBMSs include MySQL™, PostgreSQL™, SQLite™, Microsoft SQL Server™, Microsoft Access™, Oracle™, SAP™, dBASE™, FoxPro™, and IBM DB2™. A database is not generally portable across different DBMS, but different DBMSs can inter-operate by using standards such as SQL and ODBC or JDBC to allow a single application to work with more than one database.

"Determine", "calculate" and "compute," and variations thereof, as used herein, are used interchangeably and include any type of methodology, process, mathematical operation or technique.

An "enterprise" refers to a business and/or governmental organization, such as a corporation, partnership, joint venture, agency, military branch, and the like.

"Enterprise resource planning" or ERP systems integrate internal and external management information across an entire organization, embracing finance/accounting, manufacturing, sales and service, customer relationship management, and the like. ERP systems automate this activity with an integrated software application. The purpose of ERP is to facilitate the flow of information between all business functions inside the boundaries of the organization and manage the connections to outside stakeholders.

"Manufacturing process management" or MPM is a collection of technologies and methods used to define how products are to be manufactured. MPM differs from ERP/MRP, which is used to plan the ordering of materials and other resources, set manufacturing schedules, and compile cost data. A cornerstone of MPM is the central repository for the integration of all these tools and activities aids in the exploration of alternative production line scenarios; making assembly lines more efficient with the aim of reduced lead time to product launch, shorter product times and reduced work in progress (WIP) inventories as well as allowing rapid response to product or product changes.

"Material requirements planning" or MRP is a production planning and inventory control system used to manage manufacturing processes. Most MRP systems are software-based. An MRP system is intended to simultaneously meet three objectives, namely ensure materials are available for production and products are available for delivery to customers, maintain the lowest possible material and product levels in store, and plan manufacturing activities, delivery schedules and purchasing activities.

"Means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

"Module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

An "original equipment manufacturer", or OEM, manufactures product or components that are purchased by another enterprise and retailed under that purchasing enterprise's brand name. OEM refers to an enterprise that originally manufactured the product. When referring to automotive parts for instance, OEM designates a replacement part made by the manufacturer of the original part.

"Queueing theory" refers to algorithms for characterizing or defining the behavior of queues. Queueing theory is generally considered a branch of operations research because the results are often used when making business decisions about the resources needed to provide service. A queueing model based on the Poisson process and its companion exponential probability distribution often meets these two requirements. A Poisson process models random events (such as a customer arrival, a request for action from a web server, or the completion of the actions requested of a web server) as emanating from a memoryless process. That is, the length of the time interval from the current time to the occurrence of the next event does not depend upon the time of occurrence of the last event. In the Poisson probability distribution, the observer records the number of events that occur in a time interval of fixed length. In the (negative) exponential probability distribution, the observer records the length of the time interval between consecutive events. In both, the underlying physical process is memoryless. Examples of queueing theory functions or principals include BCMP network, Buzen's algorithm, Ehrenfest model, fork join queue, Gordon-Newell network, Jackson network, Little's law, Markovian arrival processes, Pollaczek-Khinchine formula, quasireversibility, random early detection, renewal theory, the Poisson process, and the like. Models based on the Poisson process often respond to inputs from the environment in a manner that mimics the response of the system being modeled to those same inputs. The analytically tractable models that result yield both information about the system being modeled and the form of their solution. Even a queueing model based on the Poisson process that does a relatively poor job of mimicking detailed system performance can be useful. The fact that such models often give "worst-case" scenario evaluations appeals to system designers who prefer to include a safety factor in their designs. The form of the solution of models based on the Poisson process often provide insight into the form of the solution to a queueing problem whose detailed behavior is poorly mimicked. As a result, queueing models are frequently modeled as Poisson processes through the use of the exponential distribution.

"Scheduling algorithms" refer to production scheduling and includes forward and/or backward scheduling. Forward scheduling is planning the tasks from the date resources become available to determine the shipping date or the due date. Backward scheduling is planning the tasks from the due date or required-by date to determine the start date and/or any changes in capacity required. Stochastic scheduling algorithms include economic lot scheduling problem (which is concerned with scheduling the production of several products on a single machine in order to minimize the total costs incurred (which include setup costs and inventory holding costs) and the economic production quantity model (which determines the quantity a enterprise and/or organization and/or retailer should order to minimize the total inventory costs by balancing the inventory holding cost and average fixed ordering cost). Examples of heuristic algorithms include the modified due date scheduling heuristic (which assumes that the objective of the scheduling process is to minimize the total amount of time spent on tasks after their due dates) and shifting bottleneck heuristic (which minimize the time it takes to do work, or specifically, the makespan in a job shop, wherein the makespan is defined as the amount of time, from start to finish, to complete a set of multi-machine jobs where machine order is pre-set for each job, the jobs are assumed to be actually competing for the same resources (machines) resulting in one or more resources acting as a 'bottleneck' in the processing, whereby the heuristic, or 'rule of thumb' procedure substantially minimizes the effect of the bottleneck).

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running. Servers commonly operate within a client-server architecture, in which servers are computer programs running to serve the requests of other programs, namely the clients. The clients typically connect to the server through the network but may run on the same computer. In the context of Internet Protocol (IP) networking, a server is often a program that operates as a socket listener. An alternative model, the peer-to-peer networking module, enables all computers to act as either a server or client, as needed. Servers often provide essential services across a network, either to private users inside a large organization or to public users via the Internet.

"Simulation modeling" refers both to discrete and continuous simulations. Discrete simulations are also known as discrete event simulations, and are event-based dynamic stochastic systems. In other words, the system contains a number of states, and is modeled using a set of variables. If the value of a variable changes, this represents an event, and is reflected in a change in the system's state. As the system is dynamic, it is constantly changing, and because it is stochastic, there is an element of randomness in the system. Representation of discrete simulations is performed using state equations that contain all the variables influencing the system. Continuous simulations also contain state variables; these however change continuously with time. Continuous simulations are usually modeled using differential equations that track the state of the system with reference to time. The simulation's output data will only produce a likely estimate of real-world events. Methods to increase the accuracy of output data include: repeatedly performing simulations and comparing results, dividing events into batches and processing them individually, and checking that the results of simulations conducted in adjacent time periods "connect" to produce a coherent holistic view of the system. Normal analytical techniques make use of extensive mathematical models which require assumptions and restrictions to be placed on the model. This can result in an avoidable inaccuracy in the output data. Simulations avoid placing restrictions on the system and also take random processes into account; in fact in some cases simulation is the only practical modeling technique applicable.

"Transfer Function" (also known as the system function or network function) is a mathematical representation, in terms of spatial or temporal frequency, of the relation between the input and output of a linear time-invariant system with zero initial conditions and zero-point equilibrium. Transfer functions are commonly used in the analysis of systems such as single-input single-output filters. The term is often used to refer to linear, time-invariant systems (LTI). Most real systems have non-linear input/output characteristics, but many systems, when operated within nominal parameters (not "over-driven") have behavior that is close enough to linear that LTI system theory is an acceptable representation of the input/output behavior. While any LTI system can be described by some transfer function or another, there are certain families of special transfer functions that are commonly used. Typical infinite impulse response filters are designed to implement one of these special transfer functions. Some common transfer function families and their particular characteristics are: Butterfield filter—maximally flat in passband and stopband for the given order; Chebyshev filter (Type I)—maximally flat in stopband, sharper cutoff than Butterworth of same order; Chebyshev filter (Type II)—maximally flat in passband, sharper cutoff than Butterworth of same order; Bessel filter—best pulse response for a given order because it has no group delay ripple; Elliptic filter—sharpest cutoff (narrowest transition between pass band and stop band) for the given order; Optimum "L" filter; Gaussian filter—minimum group delay and gives no overshoot to a step function; Hourglass filter; and Raised-cosine filter.

"Transportation theory" refers to the study of optimal transportation and allocation of resources. The transportation problem as it is stated in modern or more technical literature looks somewhat different because of the development of Riemannian geometry and measure theory. Examples of transportation theory functions or principals include Wassertein metric, transport function, and the Hungarian algorithm.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 13 depicts a screenshot according to an embodiment.

DETAILED DESCRIPTION

Figure 1:
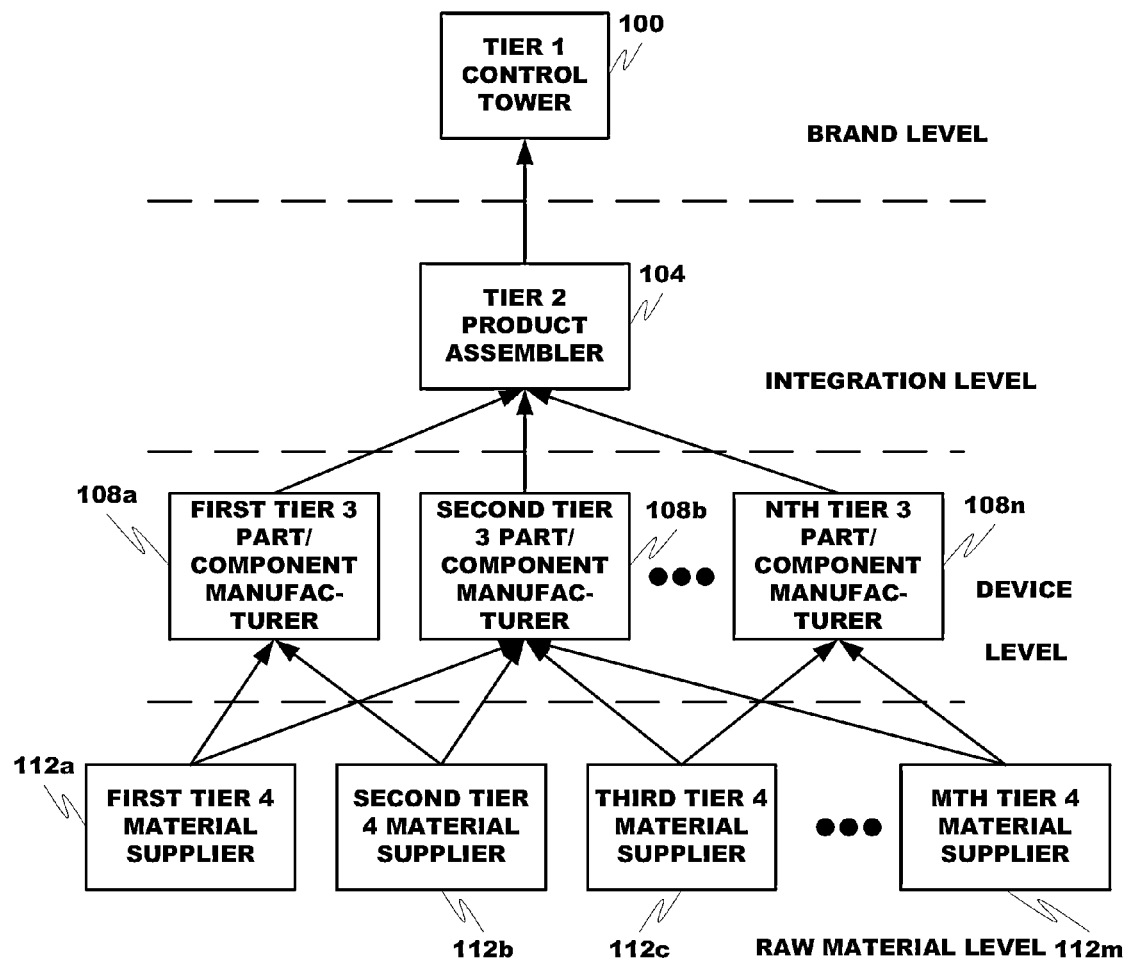
FIG. 1 is a block diagram of an exemplary three-dimensional supply chain.

The Tier 1 Control Tower Supply Chain Management System

The tier 1 control tower supply chain management system will be discussed with reference to FIG. 1. Generally, parts and components are made from materials and/or other parts and components, and products are made from material, parts, and/or components. Materials are generally considered to be raw materials, or crude or processed materials or substances.

A tier 1 control tower 100, in a brand level, typically corresponds to a retail and/or wholesale vendor, supplier, distributor, or other business that provides its branded products to end users. These businesses typically invest in research and development, product design, marketing, and brand development. Examples include Apple™, Amazon™, Cisco Systems, Inc.™, and Microsoft Corporation™. The control tower 100 monitors (and collects information regarding) the product distribution chain, product inventory levels, product demand, and/or prices of competitive products and, based on the collected information and product demand and price projections, dictates to second tier partners, prices, supply requirements, and other material terms, and accesses performance information of such second and third tier partners to monitor supply chain performance.

A tier 2 product assembler 104, in an integration level, assembles parts and/or components received from tier 3 part and/or component manufacturers into products, which are shipped to the tier 1 vendor, supplier, distributor, or other business for sale. An OEM is an example of a Tier 2 product assembler 104. Tier 2 product assembler(s) 104 provide, to the tier 1 control tower 100, its respective performance information and performance information received from tier 3 part and/or component manufacturers.

The first, second, . . . nth tier 3 part and/or component manufacturers 108a-n, at the device level, manufacture parts and/or components for assembly by the tier 2 product assembler 104 into products. The first, second, . . . nth tier 3 part and/or component manufacturers 108a-n provide, to the tier 2 product assembler 104, its respective performance information and performance information received from tier 4 material suppliers.

The first, second, third, . . . mth tier 4 material suppliers 112a-m, at the raw material level, manufacture and supply to the first, second, . . . nth their 3 part and/or component manufacturers 108a-n materials for use in manufacturing components. The first, second, third, . . . mth tier 4 material suppliers 112a-m provide, to the tier 3 part and/or component manufacturers, its respective performance information.

Each of the tier 1 control tower 100, tier 2 product assembler 104, first, second, third, . . . nth tier 3 part and/or component manufacturer, and first, second, third, . . . mth tier 4 material suppliers 112a-m correspond to an enterprise and/or organization, which may or may not be related to or affiliated with another enterprise and/or organization in the supply chain of FIG. 1.

As shown by the arrows, air, land, and sea logistics providers, such as FedEx, UPS, DHL, other trucking companies, other air freight companies, and other ocean freight carriers, link the various tier partners with an integrated network of air, sea, and ground capabilities to enable effective movement of materials, components, and products from sources to destinations.

While the above example assumes that performance information is supplied to the nearest downstream partner (or the party with whom the subject entity is in private of contract), it is possible that one or more of the tier 2, 3, and 4 partners and/or logistic providers provide performance information directly to the tier 1 control tower 100. It is further to be understood that any number of entities, factories, plants, or other facilities may exist at each of the brand, integration, device, and raw material levels.

"Performance information" typically includes any information relative to supply chain performance, including, without limitation, one or more of manufactured item output projections over a specified time period, production facility sizes and/or locations, raw material, work-in-process, and/or manufactured part, component, and/or product inventory levels, order cycle times, days of supply in inventory, manufacturing resource type, availability, reliability, and/or productivity (e.g., human and automated resource levels and resulting output levels), unit operations (e.g., manufacturing steps, functions, or operations, unloading raw materials, packaging parts, components, and/or products, loading parts, components, and/or products, and the like), financial factors (e.g., labor rates and costs, energy rates and costs, raw materials costs, freight costs, tax rates, administrative and overhead costs, contractual and/or current spot market part, component, and/or product prices (from lower tier components), and the like), number of on time shipments, number of late shipments, order mismatch count, service quality (e.g., repair returns, repeat repair, no fault found, etc.), repair cost per unit (e.g., material cost per unit, average repair time, pieces consumed per unit, etc.), inventory value (e.g., spare parts stock, or SWAP stock, inventory turnover, days of supply of spare parts, days of supply of SWAP, days sales inventory spare parts, excess spare parts, excess SWAP stock, return to vendor rate, defective or OHB, and return to vendor or TAT, etc.), historic, current, and/or projected compliance with price, supply requirements, and/or other material terms, historic, current, and/or projected parts, components, and/or product output levels, mean, median and/or average, mode, historic, and/or projected freight transportation times, delays, or requirements, and the like. The performance information can be associated with a date, month, and/or season-of-year. Metrics can be generated from the performance information, such as on time shipment rate or percentage, late shipment rate or percentage, product rejection rate based on nonconformance with one or more restrictions, specifications, and/or requirements, parts, components, and/or product acceptance rate based on conformance with one or more restrictions, specifications, and/or requirements, and the like.

Figure 2:
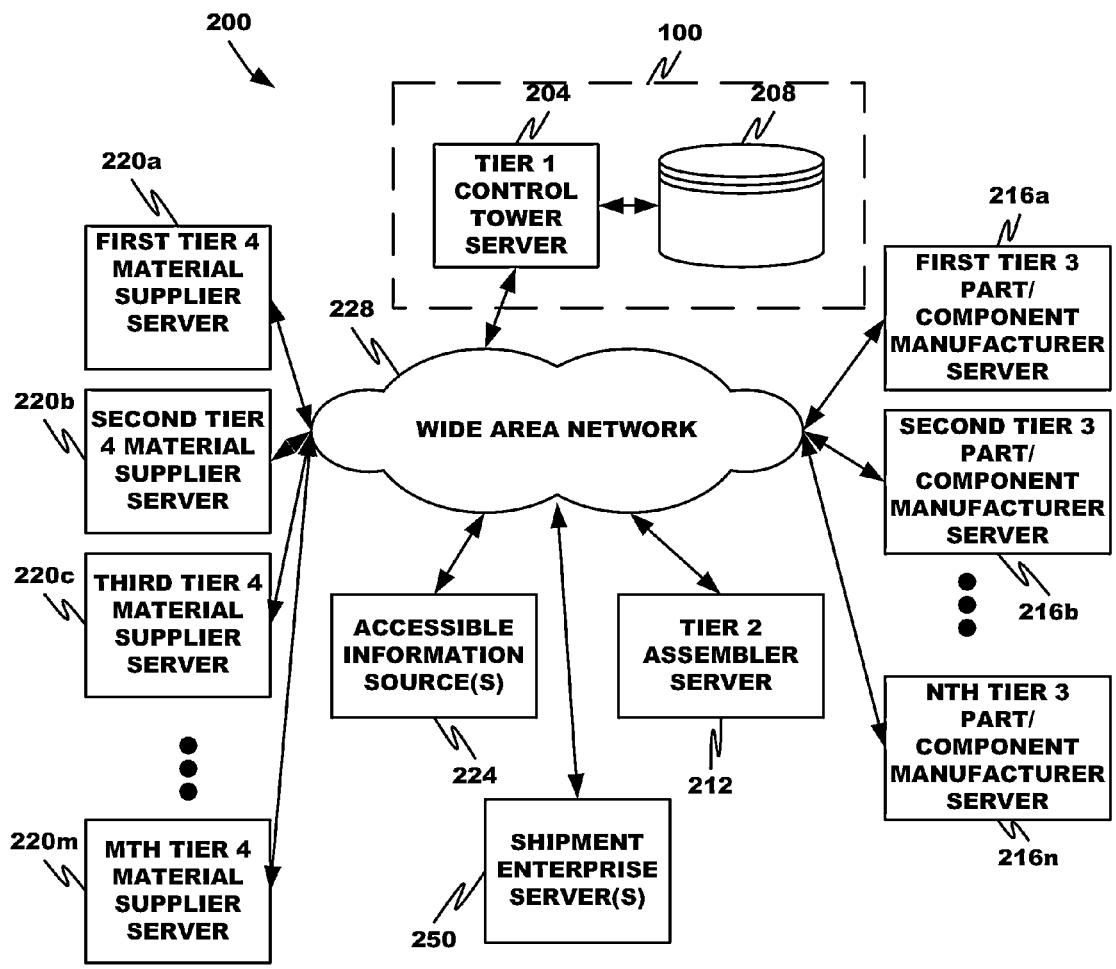
FIG. 2 is a block diagram of an exemplary supply chain management system.

FIG. 2 depicts a communications networked architecture 200 according to an embodiment.

The tier 1 control tower 100 comprises a tier 1 control tower server 204 and associated database management system (not shown) and database 208.

The tier 1 control tower server 204 can be any computerized process that shares a resource with one or more client processes. It may run one or more services (typically as a host), to service the needs of other computers on the network. Typically, the tier 1 control tower server 204 is a computer program running to serve the requests of other programs.

The database 208 can be any organized collection of data and their supporting data structures. The database can be based on any data model, including the relational model, entity-relationship model, object model, object relational model, XML, or other database model. The database 204 can include, for each enterprise and/or organization in the supply chain, not only performance information but also transactional documents (e.g., purchase order, material safety data sheets, bill of materials, supply and/or manufacturing agreements, or RMAs, and the like), name, geographical location, geopolitical location, part and/or component and/or product and/or material type and/or identity supplied by the enterprise and/or organization, current spot market and/or contractual sales price of the part and/or component and/or product and/or material type supplied by the enterprise and/or organization, respective performance metrics of the enterprise and/or organization, part and/or component and/or product and/or material supply and/or purchase commitment with another enterprise and/or organization in the supply chain, specifications and requirements for part(s) and/or component(s) and/or product(s) and/or material(s) supplied and/or purchased by the enterprise and/or organization, part and/or component and/or product and/or material quantity and shipment dates and expected arrival dates at the next enterprise and/or organization in the supply chain, order cycle and/or turnaround times, shipment and/or order volume, total number of shipments, number of on time shipments, number of late shipments, order mismatch count, repair details, and each enterprise and/or organization is associated with one or more other enterprise and/or organizations in the supply chain to indicate a contractual or other supply relationship. Each enterprise and/or organization is normally assigned a role identifier, such as buyer, seller, supplier, manufacturer, material supplier, and the like, to describe the nature of the relationship of the enterprise and/or organization to each of the associated enterprise(s) and/or organization(s) in the supply chain.

The tier 2 assembler has a corresponding server 212 to provide performance and other information, directly or indirectly, to the tier 1 control tower server 204.

Each of the first, second, . . . nh tier 3 part/component manufacturers has a corresponding server 216a-n to provide performance and other information, directly or indirectly, to the tier 1 control tower server 204.

Each of the first, second, third, . . . mth tier 4 material suppliers has a corresponding server 220a-m to provide performance and other information, directly or indirectly, to the tier 1 control tower server 204.

The shipment enterprise and/or organization server 250 represents the freight enterprises or organizations handling shipments between nodes of the supply chain. The freight enterprises and organizations can be any entity providing shipping services. Exemplary freight enterprises and organizations include railway companies, short and long haul trucking companies, freight company servers (to provide freight tracking information, freight movement projections between two locations, and the like), shipping lines, maritime shipping companies, container shipping companies, Ro-ro shipping companies, transoceanic shipping companies, logistics services or courier companies, and the like. The shipment enterprise and/or organization server 250 can provide to the tier 1 control tower server 204 provide freight tracking information, freight movement projections between two locations, and the like.

The accessible information source(s) 224 include any source of information relevant to supply chain performance, including, without limitation, news sources and/or aggregators (to provide news on current events that may impact positively or negatively the supply chain performance, such as political coup d'etates, changes or upheavals, environmental conditions and events (e.g., storms, floods, earthquakes, tsunamis, typhoons, volcanic eruptions, forest fires, and other natural disasters, and the like), criminal acts (e.g., piracy, hijacking, theft, arson, vandalism, and the like), acts of violence (e.g., terrorism, war, political upheaval, military action, and the like), news reports on and announcements by a partner or competitor, scheduled events or holidays (e.g., religious, political, or other holidays), freight disruptions (e.g., train derailment, oceangoing vessel sinking, airplane crash, freight embargos, naval blockades, and the like), energy shortages, disruptions, or blackouts, and labor disruptions (e.g., strikes or threatened strikes)), weather data sources (e.g., the National Weather Service, national and local news sources, the Weather Channel™, Weather Source™, worldweatheronline.com, and the like), governmental entities (such as courts, law enforcement authorities, geological surveys, disaster relief agencies, and the like to provide legal or regulatory changes or requirements, lawsuits, bankruptcy filings, and the like, and other information), law enforcement or military authorities (e.g., to provide information on criminal acts (e.g., piracy, hijacking, theft, arson, vandalism, and the like), and acts of violence (e.g., terrorism, war, revolution, political upheaval, military action, and the like). Such information sources can be monitored using word cloud techniques, which graphically represent word usage frequency. Generally, the more frequent a word or group of words is used the greater the likelihood that the fact or event described by the words or group of words exists. The words or group of words can further be weighted for reliability by the source, with law enforcement and military authorities being given a higher or more reliable weighting than news sources.

The various servers and sources are connected by a circuit and/or packet switched wide area network ("WAN") that covers a broad area (e.g., any telecommunications network that links across metropolitan, regional, or national boundaries) using private and/or public network transports. An exemplary WAN is the Internet.

Figure 3:
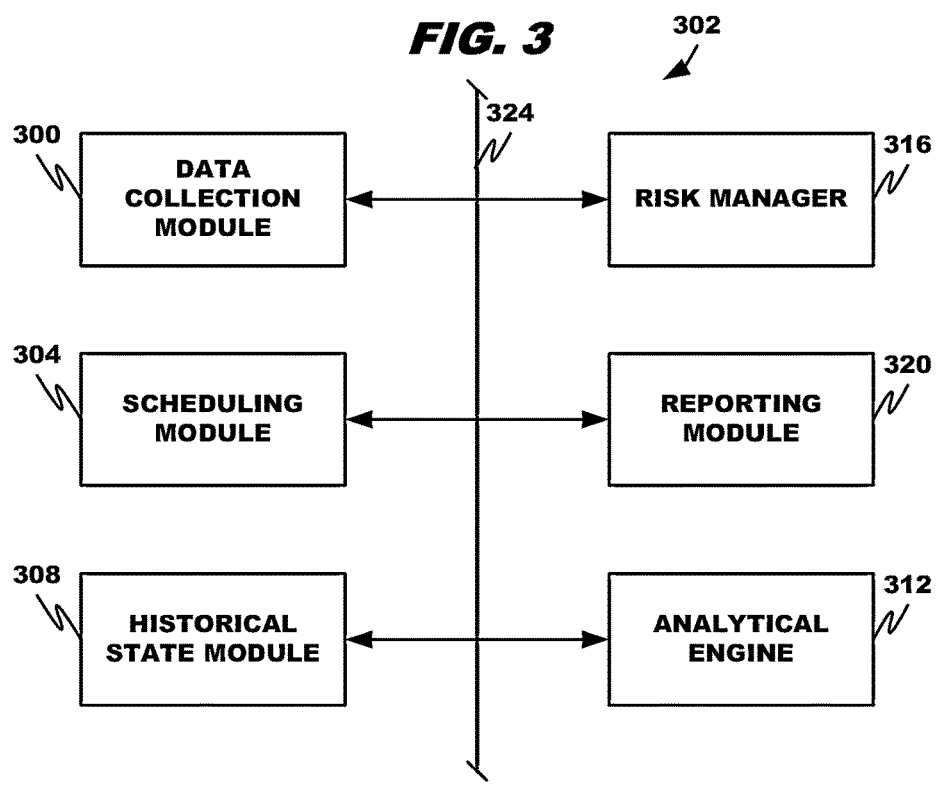
FIG. 3 is a block diagram of an exemplary tier 1 control tower.

FIG. 3 depicts an example, of a supply chain monitoring system 302 maintained by the tier 1 control tower 100. As will be appreciated, the supply chain monitoring system can be maintained by any one of the tier 1, 2, 3, and/or 4 entities or an entity independent of the foregoing. The supply chain monitoring system 302 includes a data collection module 300, a scheduling module 304, a historical state module 308, an analytical engine 312, a risk manager 316, and a reporting module 320, connected by a local area network or bus 324.

The data collection module 300 collects performance information from tier 2, 3, and/or 4 entities and freight companies in the supply chain and from accessible information source(s) 224. It further collects information regarding product inventory levels currently on hand at the tier 1 control tower. The data collection module 300 can parse the collected information, extract relevant information items, and optionally tag the extracted information items with an information type tag. The data collection module 300 can include a database management function that stores, updates and otherwise manages the data in the database 208 in accordance with a selected data model. The data structures are typically associated with one or more enterprises and/or organizations in the supply chain. Transactional documents, such as purchase orders, material safety data sheets, and bills of material, contain references to all owners down the organization level, have corresponding role types and functions specified (e.g., only a buyerRole can change request-Quantity field), and include preferences and settings referenced to an appropriate level (e.g., enterprise, organization (or the part of the enterprise involved in the supply chain transaction), user, etc.).

Events stored in the database 208 typically include event category, event type, event subtype and event severity tags. Event categories include, for example, natural disaster (e.g., natural disaster event and wherein the natural disaster is one or more of an earthquake, tsunami, volcanic eruption, fire, flood, avalanche, and landslide), weather (e.g., storm, typhoon, hurricane, cyclone, tornado, wind, and blizzard), political (e.g., coup d'etat, sabotage, terrorism, act of war, military action, police action, embargo, and blockade), and business (e.g., a maritime vessel sinking, train derailment, freight vehicle wreck, device or system malfunction, criminal activity, airplane crash, labor disruption, lawsuit, financial insolvency, and bankruptcy). Event types include, for example, geologic event, atmospheric event, geo-political, labor, and insolvency. Event subtypes include, for geologic, earthquake, volcanic eruption, tsunami, flood, and landslide; for atmospheric, storm, hurricane, cyclone, tornado, wind, and blizzard; for geo-political coup d'etates, sabotage, terrorism, and piracy; for labor, strike; and for insolvency, bankruptcy. The severity tag can include one or more of emergency, advisory, watch, and warning. Other tags will be obvious to those of ordinary skill in the art based on the teachings of this disclosure. A start and end time can be associated with the temporal impact of the event on the supply chain.

The collected information generally falls into two categories, namely static supply chain information (information items that generally do not change or change infrequently such as sites, enterprise and/or organization names, and the like) and dynamic supply chain data (information items that change frequently such as purchase orders, forecasts, and the like).

The scheduling module 304 provides scheduling information, including projected shipment arrival dates for products from the tier 2 product assembler 104 and required shipment departure dates for branded products to customers, wholesalers, and/or retailers. Each of the shipment arrival and departure dates can be linked to a set of data structures describing the shipment, including shipment source and destination, freight carrier, freight tracking information, current shipment status, shipment contents (by product type and number), date of shipment, and the like). The projected shipment arrival dates can be received from the tier 2 product assembler 104 and/or freight carrier. The shipment departure dates are determined by the tier 1 control tower based on contractual requirements, retailer and/or wholesaler current or projected inventory levels, retainer and/or wholesaler order, and the like.

The historical state module 308 tracks past performance for each entity and/or entity facility in the tier 2-4 and freight carriers (e.g., compares the actual product shipment arrival date against a selected date (received from the entity, required by contract or order, and/or projected by the tier 1 control tower 100)) and distribution chain demands (to identify seasonal trends). The past performance for an entity can be used to determine and assign a level of confidence in product deliveries from the entity being received by a selected date (received from the entity, required by contract or order, and/or projected by the tier 1 control tower 100). The level of confidence, when low, may provide a basis to order additional product from a more reliable source. The level of confidence can be based on past performance of each supplier or each different facility of a common supplier.

The analytical engine 312 receives performance and other data from the data collection module 300, scheduling information from the scheduling module 304, and historical information (such as a level of confidence) from the historical state module 308 and, based on the information, forecasts incoming shipment arrival times and outgoing shipment departure times and identifies any inability to meet distribution chain requirements, commitments or objectives (e.g., orders, contractual commitments, policies, objectives, etc.) (a "noncompliant event"). This information is provided, by the analytical engine 312 to the risk manager 316. The analytical engine 312 can be a type of situational awareness application that looks at aspects of the current state of the supply chain as well as the structural relationships and considers the effect of both internal and external events on the supply chain. Both past events and forecasted events can be considered by the analytical engine 312. The application can determine not only what happened to the supply chain but also what may happen to the supply chain, thereby providing not only a reactive but also proactive model for problem resolution.

In one application, the analytical engine 312 relies primarily on reported performance information received from tier 2 assembler(s) 212, tier 3 component manufacturer(s), tier 4 raw material supplier(s) and/or freight carrier(s) in estimating compliance with product distribution chain requirements. Disruptive events received from an accessible information source 224 are used as the basis of a query to the potentially impacted tier 2 assembler(s) 212, tier 3 part/component manufacturer(s), tier 4 material supplier(s) and/or freight carrier(s) for updated performance information. The query may be generated automatically or manually by tier 1 management.

In one application, the analytical engine 312 determines, based on performance information received from the historical state module 308, a performance rating for each enterprise and/or organization in the supply chain. The performance rating can be based on a scale from lowest performance level to highest performance level.

In one application, the analytical engine 312 relies not only on reported performance information but also internally generated projections in estimating compliance with distribution chain requirements. The compliance determination is based one or more comparisons, including a comparison of the material and/or part and/or component and/or product shipment delivery date based on the reported performance information against the material and/or part and/or component and/or product distribution chain shipment requirement(s) (as in the prior paragraph), a comparison of the material and/or part and/or component and/or product shipment delivery date based on the reported performance information against the internally generated projected material and/or part and/or component and/or product shipment delivery date, and a comparison of the material and/or part and/or component and/or product shipment delivery date based on the reported performance information against the internally generated projected material and/or part and/or component and/or product shipment delivery date.

The estimated or projected delivery date for an order can include an associated probability or likelihood and, optionally, an associated range of arrival dates that the items in the order will be timely received by the selected arrival date or within the range of arrival dates. The range of arrival dates can be selected using a standard deviation of arrival times based on current and/or historic performance information and/or other relevant information. For example, a historic reliability or probability of timely receipt at a destination facility from the selected lower tier facility, and optionally associated standard deviation of historic receipt dates relative to a target date, can be used to provide the probability and optionally standard deviation of the destination facility receiving a current shipment from the selected lower tier facility. The probability and/or standard deviation can be used by the risk manager to determine whether or not to order additional material and/or part and/or component and/or product from an alternate facility. This determination can use a probability threshold, for instance, that would require or recommend order placement to an alternative facility if the probability of the order timely arriving is too low or no order placement to the alternative facility if the probability of the order timely arriving is acceptable (e.g., exceeds the probability threshold).

For any facility in a tier, the probability could be the sum or other mathematical combination of probabilities for each upstream facility in lower tiers in a direct or indirect supply relationship with a selected facility. For example, if a third part/component manufacturing facility in tier 3 has a 50% probability of receiving timely raw material from a fourth and/or alternative facility in tier 4, a second product manufacturing facility or assembler in tier 2 has a 50% probability of receiving timely a necessary product part and/or component from the third facility and/or an alternative tier 3 facility, and the first facility in tier 1 has a 25% probability of receiving the product timely. When a selected facility, such as a product assembler, has a 50% probability of receiving timely a first necessary component from a first tier 3 part/component manufacturer and a 25% probability of receiving timely a second necessary component from a second tier 3 part/component manufacturer, the probability of a third tier 1 facility receiving the product timely from the selected product manufacturing or assembling facility is the lower of the two or 25%.

A number of algorithms may be used in generating the internal estimates.

One algorithm uses a critical path method ("CPM"), or an algorithm for scheduling a set of project activities. CPM constructs a model, at each supply chain facility and/or manufacturer, supplier, and/or assembler and/or for the overall supply chain, that includes one or more of the following: (a) a list of all activities required to deliver the product shipment to the tier 1 control tower, (b) the time (duration) that each activity or operation in the supply chain will take to completion, and (c) the dependencies between the activities. Using these values, CPM calculates the longest path of planned activities to the end of the product delivery cycle, and the earliest and latest that each activity can start and finish without making the product delivery cycle longer. This process determines which activities are "critical" (i.e., on the longest path) and which have "total float" (i.e., can be delayed without making the product delivery cycle longer). In project management, a critical path is the sequence of supply chain network activities which add up to the longest overall duration. This determines the shortest time possible to complete the product delivery cycle. Any delay of an activity on the critical path directly impacts the planned product delivery cycle completion date (i.e. there is no float on the critical path). A product delivery cycle can have several, parallel, near critical paths. An additional parallel path through the network with the total durations shorter than the critical path is called a sub-critical or non-critical path.

One algorithm uses queueing theory by characterizing the supply chain as one or more queues of work pieces being "serviced" at each tier and thereby defining supply chain behavior based on queue behavior. As will be appreciated, queueing theory is generally considered a branch of operations research because the results are often used when making business decisions about the resources needed to provide service. The queueing model can be based on a Poisson process and its companion exponential probability distribution. A Poisson process models random or pseudo-random events (such as a work piece arrival from a lower tier partner, a supply chain disruptive event, or the completion of an action requested of a resource over which the servicing tier has no control) as emanating from a memoryless process. That is, the length of the time interval from the current time to the occurrence of the next event does not depend upon the time of occurrence of the last event. In the Poisson probability distribution, the observer records the number of events that occur in a time interval of fixed length. In the (negative) exponential probability distribution, the observer records the length of the time interval between consecutive events. In both, the underlying physical process is memoryless. Examples of queueing theory functions or principals include BCMP network, Buzen's algorithm, Ehrenfest model, fork join queue, Gordon-Newell network, Jackson network, Little's law, Markovian arrival processes, Pollaczek-Khinchine formula, quasireversibility, random early detection, renewal theory, the Poisson process, and the like. Models based on the Poisson process often respond to inputs from the environment in a manner that mimics the response of the system being modeled to those same inputs. The analytically tractable models that result yield both information about the system being modeled and the form of their solution. Even a queueing model based on the Poisson process that does a relatively poor job of mimicking detailed system performance can be useful. The fact that such models often give "worst-case" scenario product cycle evaluations can support the risk manager including a safety factor in supply chain changes and modifications, including product delivery requirements. Queueing models are frequently modeled as Poisson processes through the use of an exponential distribution.

One algorithm is a scheduling algorithm, which considers product production scheduling and shipping and includes forward and/or backward scheduling. Forward scheduling is planning the tasks from the date resources become available to determine the shipping date or the due date. Backward scheduling is planning the tasks from the due date or required-by date to determine the start date and/or any changes in capacity required. Stochastic scheduling algorithms can include economic lot scheduling problem (which is concerned with scheduling the production of several products on a single machine in order to minimize substantially the total costs incurred (which include setup costs and inventory holding costs) and the economic production quantity model (which determines the quantity a enterprise and/or organization and/or retailer should order to minimize the total inventory costs by balancing the inventory holding cost and average fixed ordering cost). Examples of heuristic algorithms include the modified due date scheduling heuristic (which assumes that the objective of the scheduling process is to minimize substantially the total amount of time spent on tasks after their due dates) and shifting bottleneck heuristic (which minimize the time it takes to do work, or specifically, the makespan in a job shop, wherein the makespan is defined as the amount of time, from start to finish, to complete a set of multi-machine jobs where machine order is pre-set for each job, the jobs are assumed to be actually competing for the same resources (machines) resulting in one or more resources acting as a 'bottleneck' in the processing, whereby the heuristic, or 'rule of thumb' procedure substantially minimizes the effect of the bottleneck).

One algorithm is simulation modeling using discrete or continuous simulations. Discrete simulations are also known as discrete event simulations, and are event-based dynamic stochastic systems. In other words, the system, or supply chain, contains a number of states, and is modeled using a set of variables. If the value of a variable changes, this represents an event, and is reflected in a change in the system's state. As the system is dynamic, it is constantly changing, and because it is stochastic, there is an element of randomness in the system. Representation of discrete simulations is performed using state equations that contain all the variables influencing the system or supply chain. Continuous simulations also contain state variables; these however change continuously with time. Continuous simulations are usually modeled using differential equations that track the state of the system, or supply chain, with reference to time. The simulation's output data will only produce a likely estimate of real-world events (i.e., product shipment delivery). Methods to increase the accuracy of output data include: repeatedly performing simulations and comparing results, dividing events into batches and processing them individually, and checking that the results of simulations conducted in adjacent time periods "connect" to produce a coherent holistic view of the system. Normal analytical techniques make use of extensive mathematical models which require assumptions and restrictions to be placed on the model. This can result in an avoidable inaccuracy in the output data. Simulations avoid placing restrictions on the system and also take random processes into account; in fact in some cases simulation is the only practical modeling technique applicable.

The analytical engine 312 can use pattern or template matching to determine internal estimates. The patterns or templates can be based on historical data patterns and observed shipment times and/or on patterns or templates predetermined or predefined by system administrators. The analytical engine 312 can search by one or more of the time, location and setting. For example, for an earthquake in Asia having a specified severity level, the analytical engine 312 can search for other earthquake events in Asia over the last three years having a similar severity level and determine the actual shipment times and/or administrator shipping estimates or projections made for the currently selected or other supply chain to determine a current estimate or projection.

The analytical engine 312 can detect unreported events by identifying unexpected variations in collected performance information. For example, where one or more selected nodes of the supply chain experience a sudden drop in rate of on-time shipments or rise in rate of late shipments and the drop is sustained over a selected period, the analytical engine 312 can deduce that a disruptive event has occurred. The possibility of an occurrence of an unreported disruptive event can be reported to a system or supply chain enterprise and/or organization administrator. Likewise, the severity of an event and/or shipment projections can be changed and rendered more accurate by observing actual behavior following creation of the event or estimate or projection. This information can also be used to refine temporally proximate estimates or projections.

The analytical engine 312 and risk manager 316 can use other variables and/or algorithms to determine the relative health of the supply chain. For example, the analytical engine 312 can employ a metric—CpX, which can be a measure of risk and capable of substantially optimizing the supply chain. The metric can be determined through the collection, aggregation, and transformation of supply chain data, including performance information, and, when optimized, can modify system parameters of the logistic or supply chain system to reduce and/or optimize risk profiles for any selected supply chain parameter or object, typically a given product, a selected product line, and/or a customer account.

Risk can be determined given a time series of data collected by the data collection module. This data can be presented either as a first linear array (1×N) where N is the number of factors collected. The factors can include one or more of the factors, parameters, or supply chain characteristics identified herein. The factors can include risk factors, such as economic risk, environmental risk, geopolitical risk, societal risk, and technological risk. A transfer function (N×M) can relate the collection of such (risk) factors to variability (risk) of critical factors, (be they cost, time to delivery, the same or another risk factor, etc.), which is the (1×M) linear array. The (1×N) linear array can also be transformed into a single number or factor or given a coloration indicative of an "overall" metric of risk (variability). The overall metric of risk can be a supply chain health index or risk.

After optimization of the collected factors and comparing real data, the transfer function (N×M) can be substantially optimized—and it can represent the operational parameters of the supply chain (for better or worse).

To optimize the supply chain (or substantially minimize the magnitude of the 1×M scalar), one can apply a reverse transform function and fine tune the factors in the (1×N) linear array to effect the change—meaning for each optimal element 1 to . . . N, actual operations (e.g., order cycle, warehouse sizing, assembly line capacity, order aggregation, price, etc.) will be changed or modified to achieve the desired risk profile. Alternatively, risk protection can be set, configured, or determined at various levels by setting the scalar (high, medium, low) and changing the various offerings to meet the customer need—as some customers can deal with risk better than others).

Alternatively, given a multiple set of (1×N) and (1×M), a multitude or plurality of transfer functions can be determined, particularly where state or situational differences exist among one or more of business segments, product portfolios, customers profiles, etc. In such cases, the 1×M (minimum) linear array would likely be different, as would the substantially optimal 1×N linear array.

In cases where each supply chain situation or state is mutually exclusive, the solutions themselves will be likewise, mutually exclusive. In new scenarios, the linear combination of such solution would be applicable in direct proportion to their contribution, provided that there is no correlation between the solutions.

The risk manager 316 applies a rule or policy set or template to the information or output received from the analytical engine 312 and provides reporting information to the reporting module 320 for presentation to a (human) manager. The reporting information may include not only a warning (with an associated probability and/or level of confidence) that a noncompliant event will occur and optionally a recommendation on how to mitigate and/or avoid the noncompliant event. Mitigation recommendations include, for example, ordering products from a different facility of the tier 2 product assembler 104 and/or from a different tier 2 product assembler 104, using a type of freight company or specific freight company to provide faster incoming and/or outgoing product shipment, cancelling or altering an existing order (e.g., increase or decrease product quantity and/or delay or expedite product shipment date) with a tier 2 product assembler 104 and/or downstream distribution chain entity, shipping product from a different tier 1 facility to the selected destination in the distribution chain to offset the noncompliant event, and ship a different product to the selected destination in the distribution chain to offset the noncompliant event. The recommendation can be performed automatically by the risk manager 316.

The risk manager 316 can identify problems or choke points or bottlenecks in the supply chain, generate alerts and/or notifications to administrators of predetermined events (such as a monitored parameter falling below or exceeding a selected threshold), and/or provide recommended changes to the supply chain to provide greater reliability, more reliable and faster material and/or part and/or component and/or product manufacture and delivery cycles, more material turns, and reduced waste. The risk manager 316 at the tier 1 control tower 100 can do this, for example, by analyzing the reported performance information using advanced planning and scheduling techniques by which raw materials and production capacity are optimally allocated to meet demand. Recommendations could include restructuring tier 1, 2, 3 and 4 relationships, using differently located facilities for lesser or greater production, using different freight modes and/or carriers, and reconfiguring the layout and/or production unit operations within a selected facility. A performance risk can be associated with each recommendation based on factors, such as performance rating, geographic location of the recommended enterprise and/or organization relative to the geographic locations of the upstream enterprise and/or organization (if any) supplying the recommended enterprise and/or organization and of the downstream enterprise and/or organization (if any) receiving material and/or product from the recommended enterprise and/or organization, and/or the likelihood of a disruptive event impacting the recommended enterprise and/or organization and/or a shipment line associated therewith.

The risk manager 316 can determine a possible or potential financial impact on the enterprise or organization associated with each recommendation or, in the absence of any action, simply as a result of the event. The possible or potential financial impact can be done on one or more affected product lines and/or for the enterprise or organization as a whole. A risk or probability can be assigned to each possible or potential financial impact to form a type of risk portfolio. Pricing input from a price monitoring module (discussed below) can assist in determining product price increases as a result of the event. Decreases in demand for the product can be projected based on the price increase. The decreased demand can then be converted into a projected gross sales revenue to be used in the financial forecast. The possible or potential financial impact can be determined for an instance of an event or proactively if a selected event were to occur. Electronic manufacturing services, in particular, would benefit from this type of financial impact analysis.

The risk manager 316 can apply manufacturing process management or MPM and/or enterprise resource planning ("ERP") and/or materials requirement planning ("MRP") techniques. MPM is a collection of technologies and methods used to define how products are to be manufactured. MPM differs from ERP/MRP, which is used to plan the ordering of materials and other resources, set manufacturing schedules, and compile cost data. MPM can provide the central repository for the integration of all these tools and activities and aid in the exploration of alternative production line or sequence or cycle scenarios; making assembly lines more efficient with the aim of reduced lead time to product launch, shorter product times and reduced work in progress (WIP) inventories as well as allowing rapid response to product or product changes.

The risk manager can use scheduling algorithms to determine and/or identify recommended changes to the supply chain.

The risk manager can use pattern or template matching to determine and/or identify recommended changes to the supply chain. The patterns or templates can be based on historical data patterns and observed administrator responses and/or on patterns or templates predetermined or predefined by system administrators. The risk manager can search by one or more of the time, location and setting. For example, for an earthquake in Asia having a specified severity level, the risk manager can search for other earthquake events in Asia within the last three years having a similar severity level and determine the changes to the currently selected or other supply chain to determine a currently recommended set of changes.

The risk manager can use simulation modeling to determine and/or identify recommended changes to the supply chain.

The risk manager can use transportation theory to determine the optimal transportation and/or allocation of supply chain resources. Examples of transportation theory functions or principals include Wassertein metric, transport function, and the Hungarian algorithm.

The risk manager can use capacity planning, which is the process of determining the production capacity needed by the supply chain to meet changing demands for the branded products. In the context of capacity planning, "design capacity" is the maximum amount of work that the supply chain is capable of completing in a given period, "effective capacity" is the maximum amount of work that the supply chain is capable of completing in a given period due to constraints such as quality problems, delays, material handling, etc.

The risk manager can intelligently relate the geographical location of each facility in each tier with a partner facility in a higher tier and/or the relative shipping costs and/or standard deviation thereof from a facility in one tier to a partner facility in a higher tier and control relationships to reduce or substantially minimize transportation costs. This mapping, which can be in the form of a unit shipping cost from each facility in a lower tier to each facility in the adjacent higher tier, can also be used to intelligently order materials and/or components and/or products from a lower tier facility to an upper tier facility experiencing a supply constraint so as to maintain lower transportation or shipping costs.

The risk manager can intelligently relate the geographical location of each facility in each tier with a partner facility in a higher tier and/or the relative shipping time and/or standard deviation thereof from a facility in one tier to a partner facility in a higher tier and control relationships to reduce or substantially minimize transportation time. This mapping, which can be in the form of a shipping time from a point of loading at each facility in a lower tier to arrival at each facility in the adjacent higher tier, can also be used to intelligently order materials and/or components and/or products from a lower tier facility to an upper tier facility experiencing a supply constraint so as to maintain lower transportation or shipping times to substantially minimize disruptions in the distribution chain.

The risk manager can intelligently relate the rate of turnover or unit manufacturing time and standard deviation thereof from time of receipt of an order for a manufactured item to the time of shipping of the manufactured item for each facility in each tier, optionally associated with a shipping time required to ship the manufactured item to a partner facility in a higher tier and/or standard deviation thereof and control relationships to reduce or substantially minimize unit product manufacturing time. This mapping can also be used to intelligently order materials and/or components and/or products from a lower tier facility to an upper tier facility experiencing a supply constraint so as to maintain lower product manufacturing and transportation or shipping times to substantially minimize disruptions in the distribution chain.

The risk manager can intelligently relate the unit manufacturing cost, or price, of material and/or component and/or product and/or standard deviation thereof from each facility in each tier and optionally unit shipping costs from the facility in a lower tier to a partner facility in a higher tier and/or standard deviation thereof, and control supply and facility relationships to reduce or substantially minimize unit costs and/or prices at the lower tier facility or as delivered at the destination partner facility in the adjacent higher tier. This mapping, which can be in the form of a unit cost or price, optionally unit shipping cost from each facility in a lower tier to each facility in the adjacent higher tier, and total unit cost or price as delivered, can be used to intelligently order materials and/or components and/or products from a lower tier facility to an adjacent upper tier facility so as to maintain lower transportation or shipping costs.

In either of the prior cost mappings, each facility can have, in the adjacent lower tier and adjacent higher tier, order of partner facility preferences in the event of a need to order additional material and/or component and/or product to an upper tier facility experiencing a supply constraint so as to maintain lower unit costs and/or prices at the source facility and/or unit transportation or shipping costs and/or total unit costs and/or prices as delivered. In this manner, when a disruptive event adversely impacts supply from a facility or a facility is otherwise unable to meet an existing or new order for material and/or component and/or product the risk manager can easily select a next preferred supplier and forward the order or unsatisfied portion of the order to the next preferred facility.

As will be appreciated, any of the other estimates or projections described herein can include a level of confidence or probability that the estimate or projection is true or false (as appropriate).

The reporting module 320 provides the reporting information to tier 1 management. The reporting module 320 can not only provide reports containing performance information but also generate map displays. FIGS. 11-17 are a series of screen shots demonstrating reporting information provided by the reporting module 320.

Figure 16:
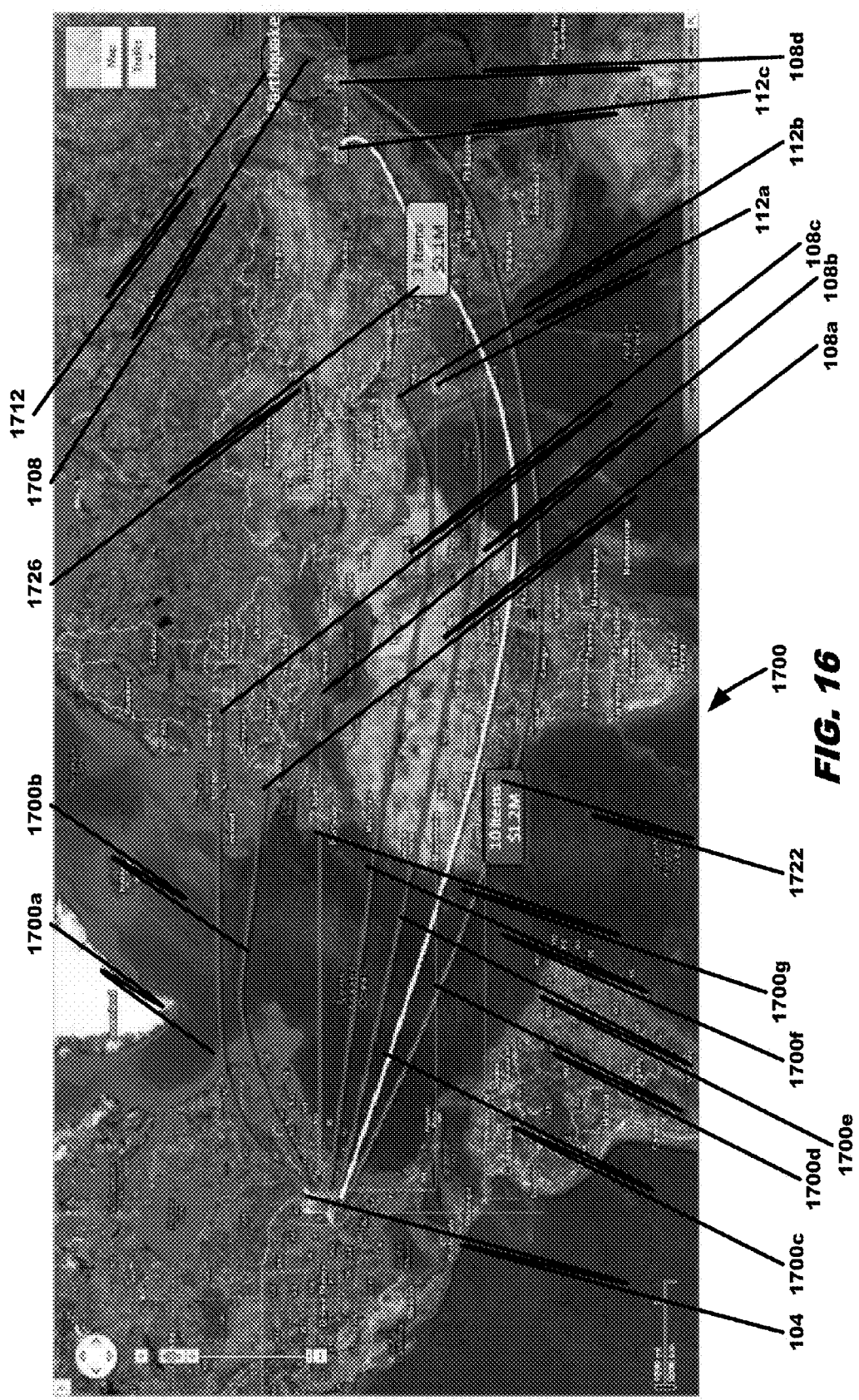
FIG. 16 depicts a screenshot according to an embodiment.

With reference to FIG. 16, the display 1700 shows locations of various supply chain nodes, including the tier 2 product assembler 104, first, second, . . . nth tier 3 part/component manufacturers 108a-n, and first, second, third, . . . mth tier 4 material suppliers 112a-m. Material and/or part and/or component and/or product shipment lines 1704a-g between the various related nodes can be shown. Different colors or shades of a common color can be assigned to each shipment line to indicate on-time shipments, slightly delayed shipments, moderately delayed shipments, and heavily delayed shipments. A disruptive event, such as a weather event, earthquake event, business disruption event, geo-political event, and financial disruption event, can be shown on the map at a location 1708 impacted by the event. A range of disruption 1712 is also assigned to the event indicating a likely spatial range impacted by the event. As will be appreciated, different event types and events for a given event type can have differing assigned spatial ranges of disruption. For example, an earthquake may have a larger spatial range of disruption than a storm, and an 8.0 earthquake on the Richter scale would have a larger spatial range of disruption than a 5.5 earthquake on the Richter scale. A range can be modeled by many techniques, such as by using a shape file. Additionally, moving a cursor over a node, shipment line, or event can cause a box or icon, such as shown by boxes 1722 and 1726, to appear providing relevant information about the associated one of the node, shipment line, or event. For example, relevant information about the node can include enterprise and/or organization name, materials and/or part and/or component and/or products supplied by the enterprise and/or organization, and one-hop related enterprises and/or organizations (e.g., the supplier to the selected node and the purchaser from the selected node). Relevant information about the shipment line can include the name of the freight carrier, number, type, and value of material and/or part and/or component and/or product currently being shipped, and the current status of the shipment. Relevant information for the event can include the event category, type and subtype and severity, number of materials and/or part and/or component and/or products impacted, number of downstream parts and/or components and/or products impacted (such as the parts and/or products supplied to the tier 2 product assembler 104), potential financial impact on the tier 1 control tower 100, and number of supply chain sites affected. The boxes in FIG. 16 show relevant shipment information including a number and value of products, parts, and/or components currently en route along the corresponding shipment line.

Figure 11:
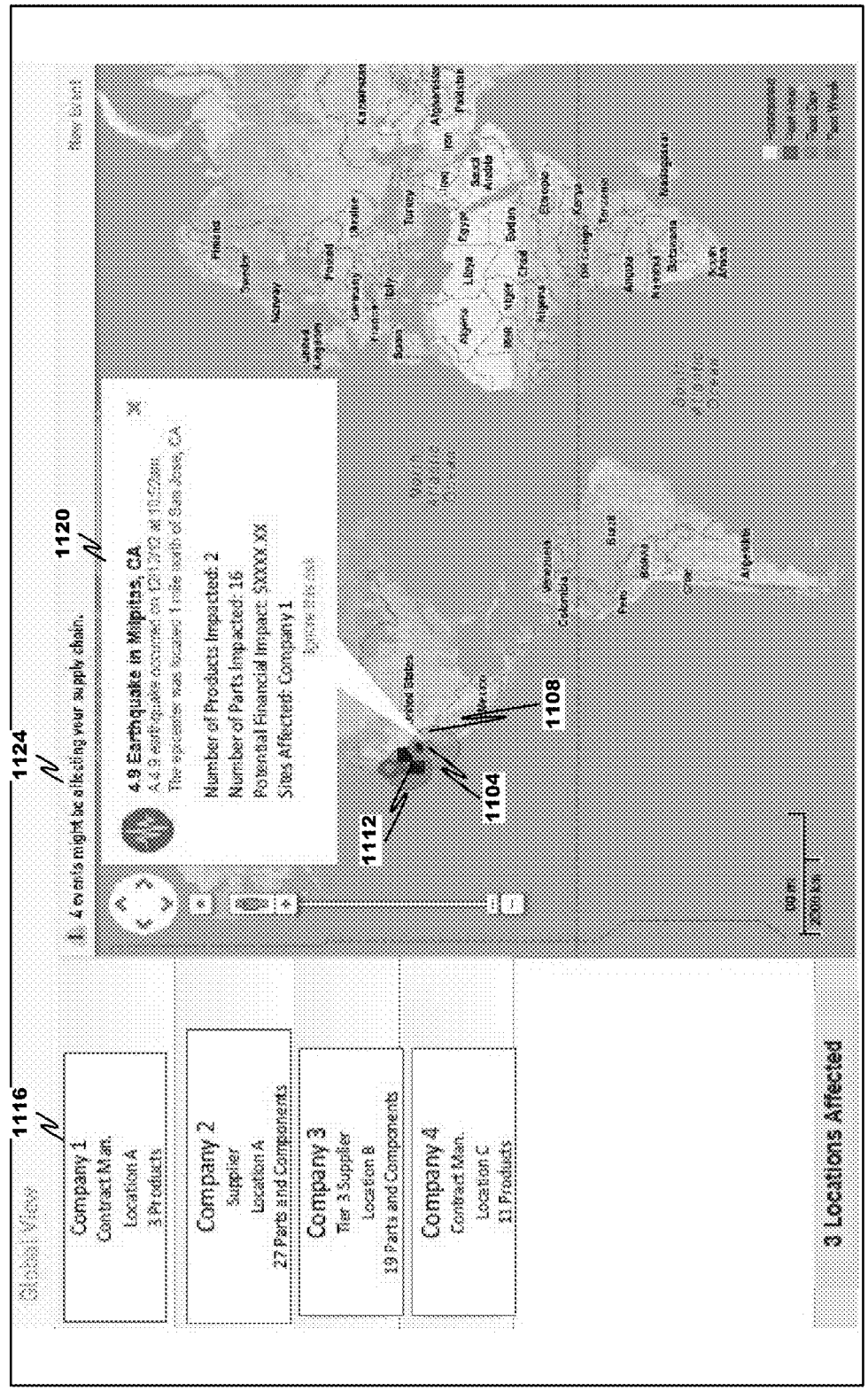
FIG. 11 depicts a screenshot according to an embodiment.

With reference to FIG. 11, the reporting module provides a display 1100 showing a location 1104 and impacted range 1108 of an event (a 4.9 earthquake) and locations 1112 and descriptions 1116 of various enterprises and/or organizations in the supply chain, namely companies 1-4 with relevant information provided about each enterprise and/or organization (e.g., role, location, and products, parts, and/or components provided to the supply chain). By moving the cursor over the location of the event, a box 1120 appears providing event information, including a description and location of the event, number of products impacted by the event, number of parts impacted by the event, potential financial impact of the event, and supply chain sites affected by the event. A message 1124 is also provided at the upper part of the display 1100 indicating a number of events (e.g., 4) potentially impacting the supply chain at the present time.

Figure 12:
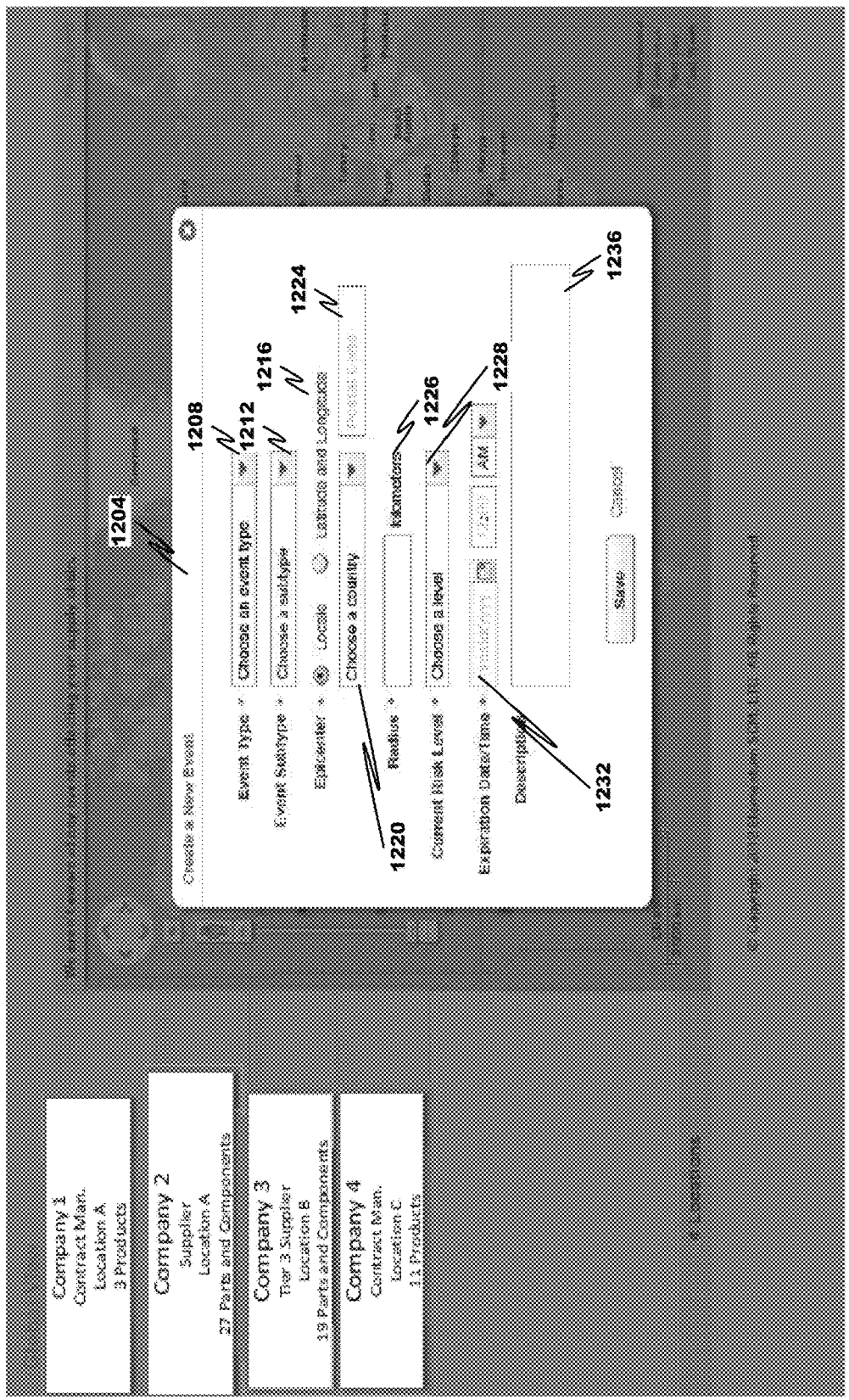
FIG. 12 depicts a screenshot according to an embodiment.

With reference to FIG. 12, the reporting module provides a display 1200 showing an administrator input box 1204 to provide event information to the data collection module. The input box 1204 includes fields for event type 1208, event subtype 1212, event epicenter 1216 (which lets the administrator elect whether to have the data collection module locate the epicenter or provide latitude and longitude of the epicenter), country of epicenter location 1220, postal code of epicenter location 1224, radius impacted by the event 1226, current risk (or severity) level 1228, event expiration date and time 1232, and event description 1236.

Figure 13:
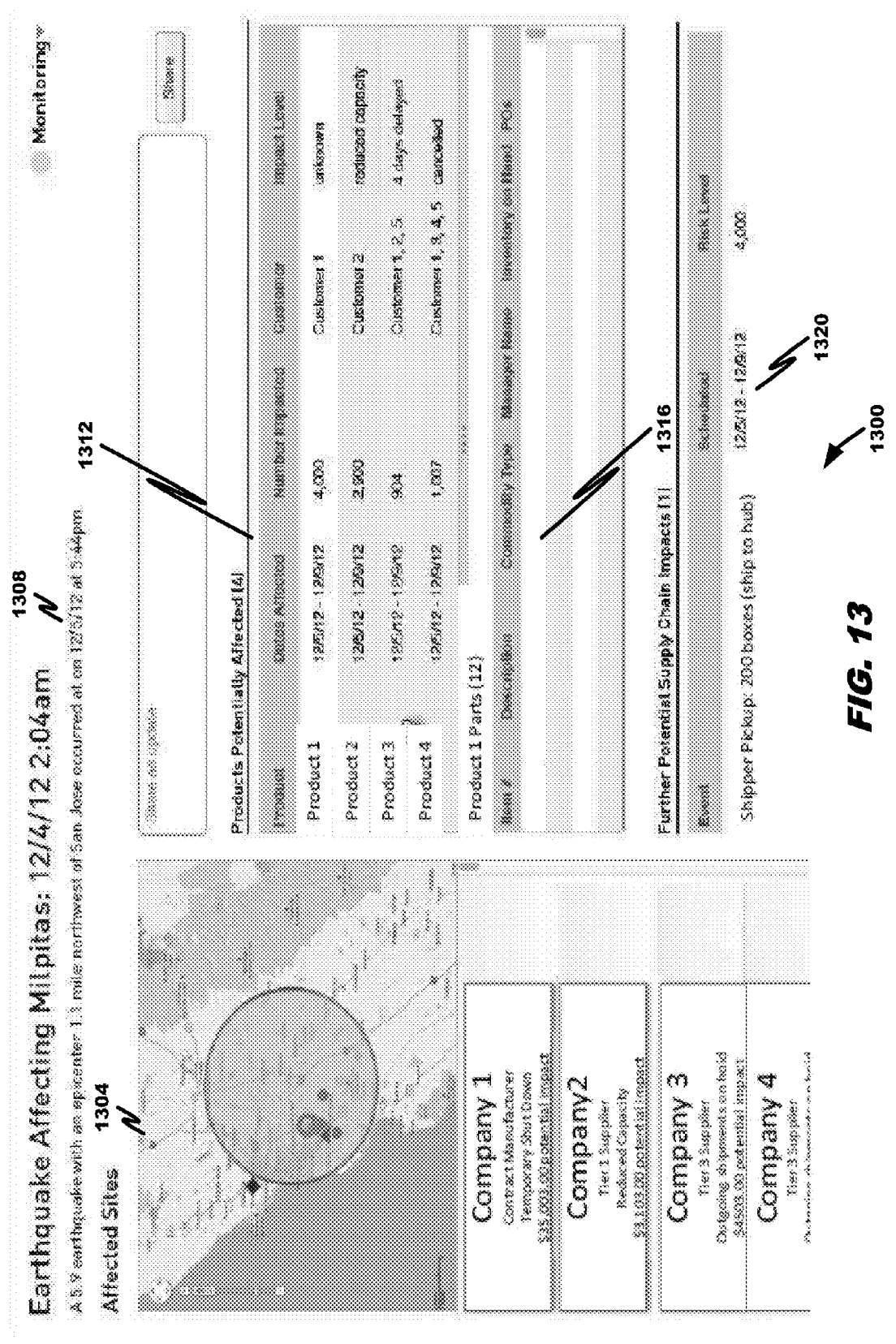

With reference to FIG. 13, the reporting module provides a display 1300 providing information about the impact of a selected event on the supply chain. The display 1300 includes a picture 1304 showing the epicenter and impact radius of the event and supply chain sites affected within the impact radius, a description of the event 1308, products potentially affected by the event 1312, parts and/or components potentially affected by the event 1316, and other potential supply chain impacts 1320.

Figure 14:
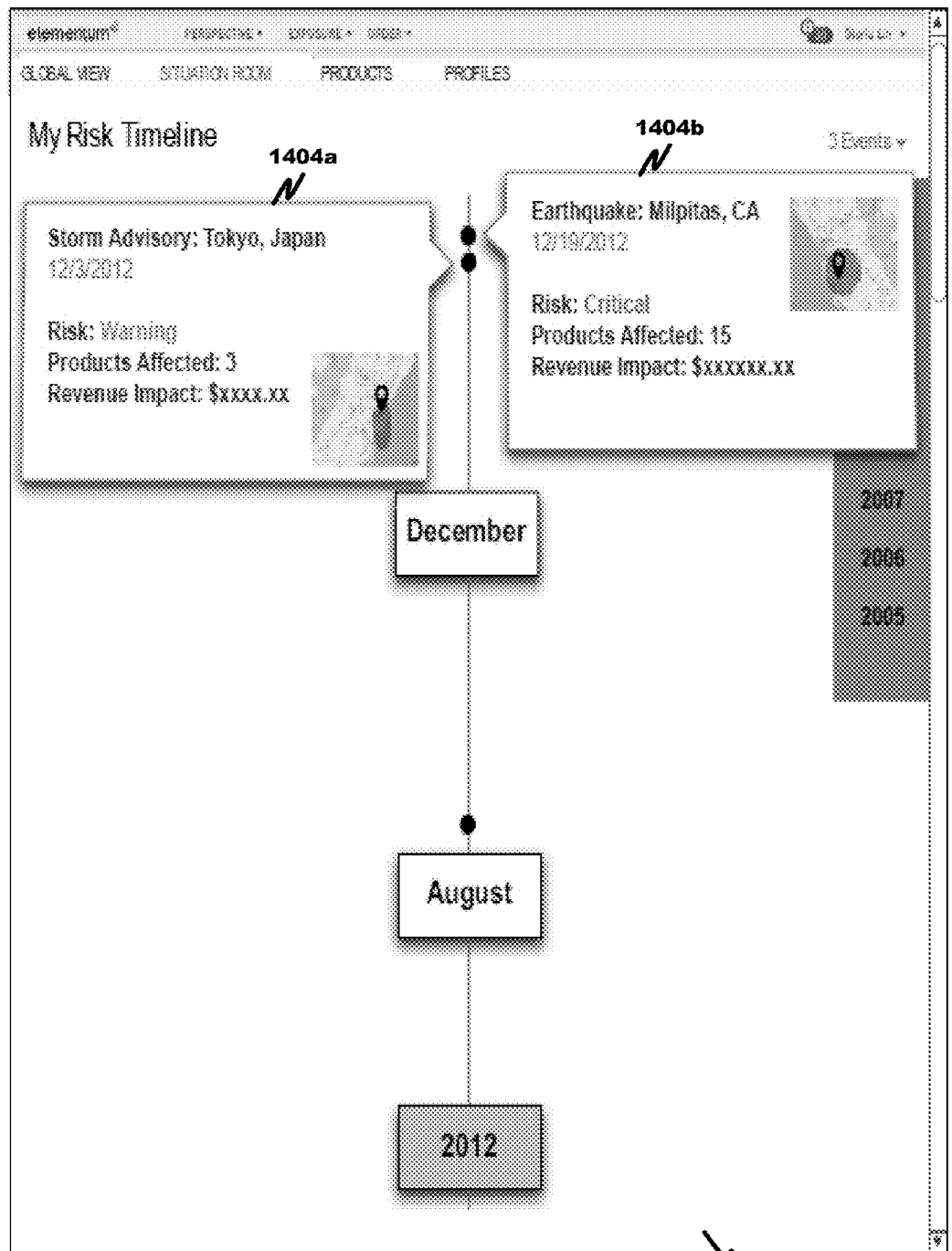
FIG. 14 depicts a screenshot according to an embodiment.

With reference to FIG. 14, the reporting module provides a display 1400 showing events occurring over a selected time period. Each event description 1404 shows event type, event date, event severity, number of products, parts, or components affected, and revenue impact on the selected enterprise and/or organization.

Figure 15:
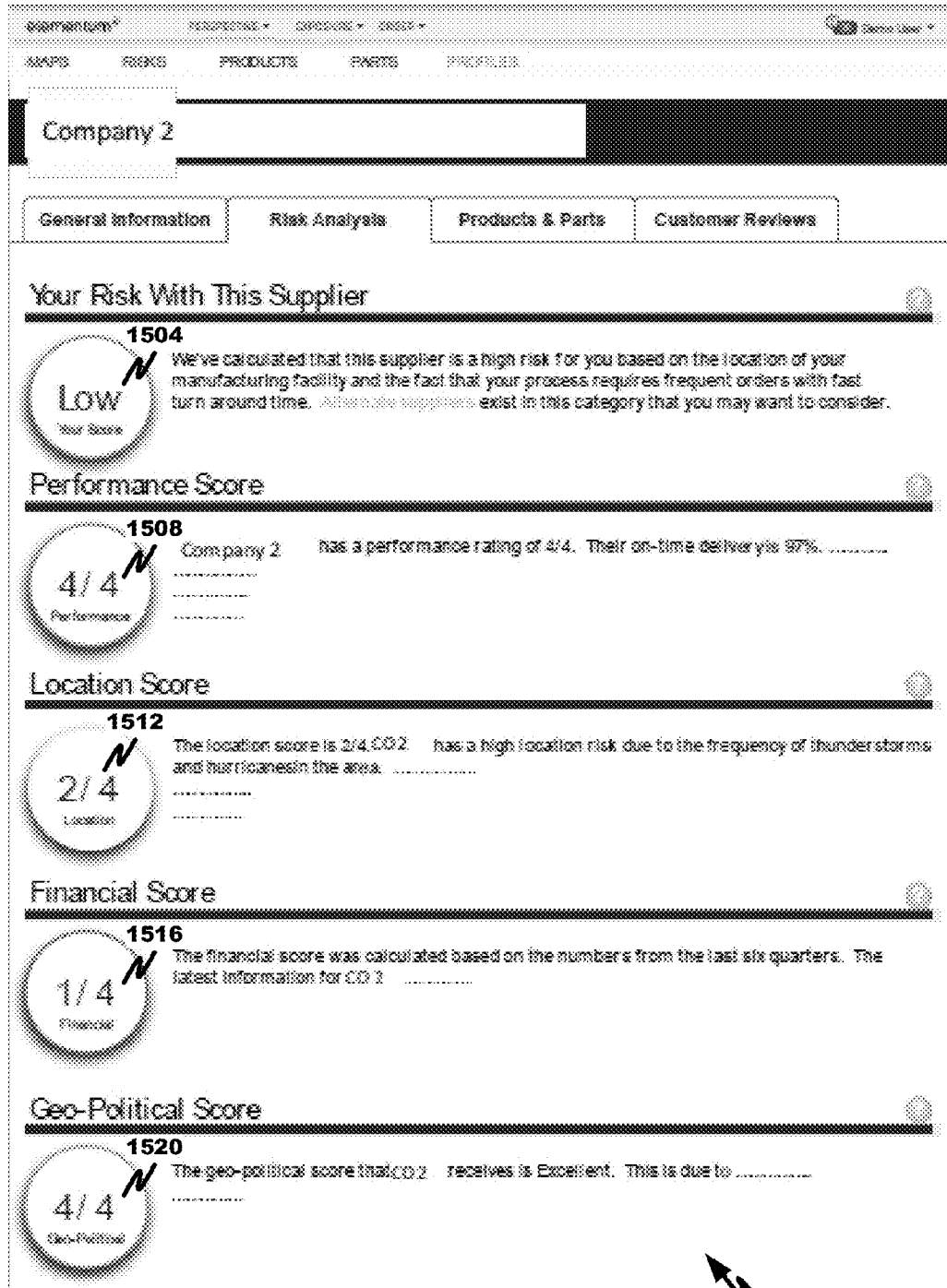
FIG. 15 depicts a screenshot according to an embodiment.

With reference to FIG. 15, the reporting module provides a display 1500 showing a product, part, or component supplier description for a selected company (e.g., enterprise or organization). The description includes a supplier risk category 1504 (e.g., low, moderate, and high) and the various factors used in developing the risk category. These factors are: supplier performance score 1508 (based on historical supplier performance information), supplier location score 1512 (the degree to which the supplier site location can positively or negatively impact supply chain performance), supplier financial score 1516 (the degree to which the supplier financial condition can positively or negatively impact supply chain performance), and supplier geo-political score 1520 (the degree to which the geo-political location of the supplier can positively or negatively impact supply chain performance). The risk category is determined by the risk manager for each tier 1 control tower server 204, tier 2 assembler server 212, first, second, . . . nth tier 3 component manufacturer server 216a-n, and first, second, third, . . . mth tier 4 material (e.g., part and/or component) supplier server 220a-m, and the performance, location, financial, and geo-political scores are determined by the analytical engine, for each tier 1 control tower server 204, tier 2 assembler server 212, first, second, . . . nth tier 3 component manufacturer server 216a-n, and first, second, third, . . . mth tier 4 material supplier server 220a-m. The performance, location, financial, and geo-political scores can be assigned by the analytical engine and/or administrators. The supplier risk category and performance, location, financial, and geo-political scores are not limited to suppliers but may be assigned not only to the tier 1 control tower 100, tier 2 assembler 104, first, second, . . . nth tier 3 component manufacturer 108a-n, and first, second, third, . . . mth tier 4 material supplier 112*a-m* but also freight carriers between and among two or more of the foregoing.

Operation of the Tier 1 Control Tower Supply Chain Management System

Figure 4:
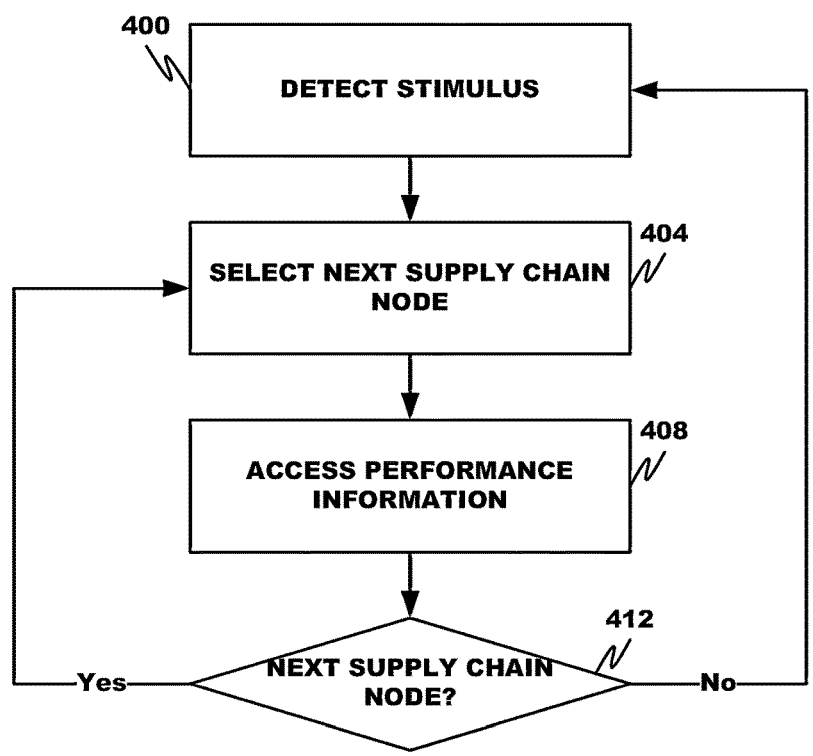
FIG. 4 is a flow chart of an exemplary data collection module.

Referring to FIG. 4, the operation of the data collection module 300 will be discussed.

In step 400, the data collection module 300 receives a stimulus. Stimuli include, for example, a request from a tier 1 manager, reported performance information received from a lower tier partner, a request from the risk manager 316 and/or scheduling module 304 and/or analytical engine 312, passage of time, and the like.

In step 404, the data collection module 300 selects a (next) supply chain node to query for performance information.

In step 408, the data collection module 300 accesses, or receives, the performance information.

In decision diamond 412, the data collection module 300 determines whether there is a next supply chain node to be considered for performance information. If so, the data collection module 300 returns to step 404. If not, the data collection module 300 returns to step 400 and awaits the next stimulus instance.

Figure 5:
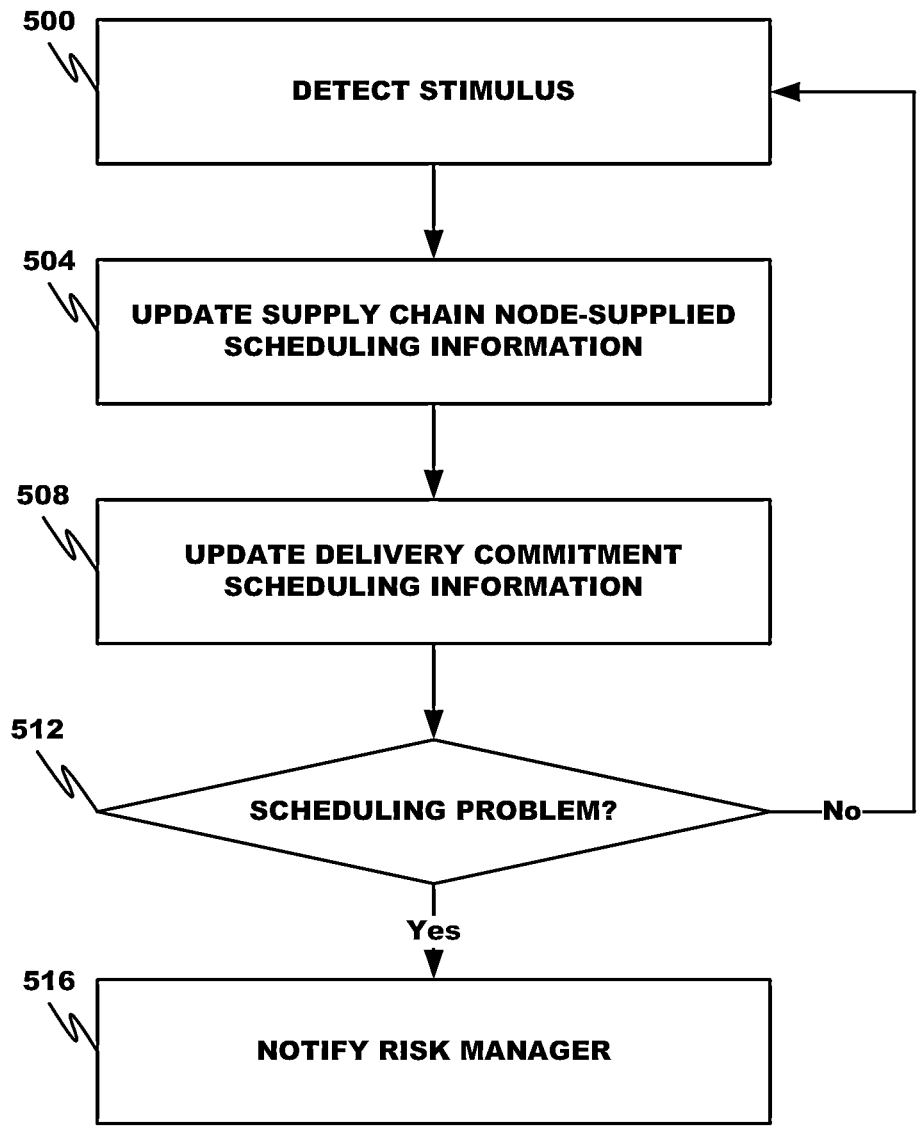
FIG. 5 is a flow chart of an exemplary scheduling module.
Figure 6:
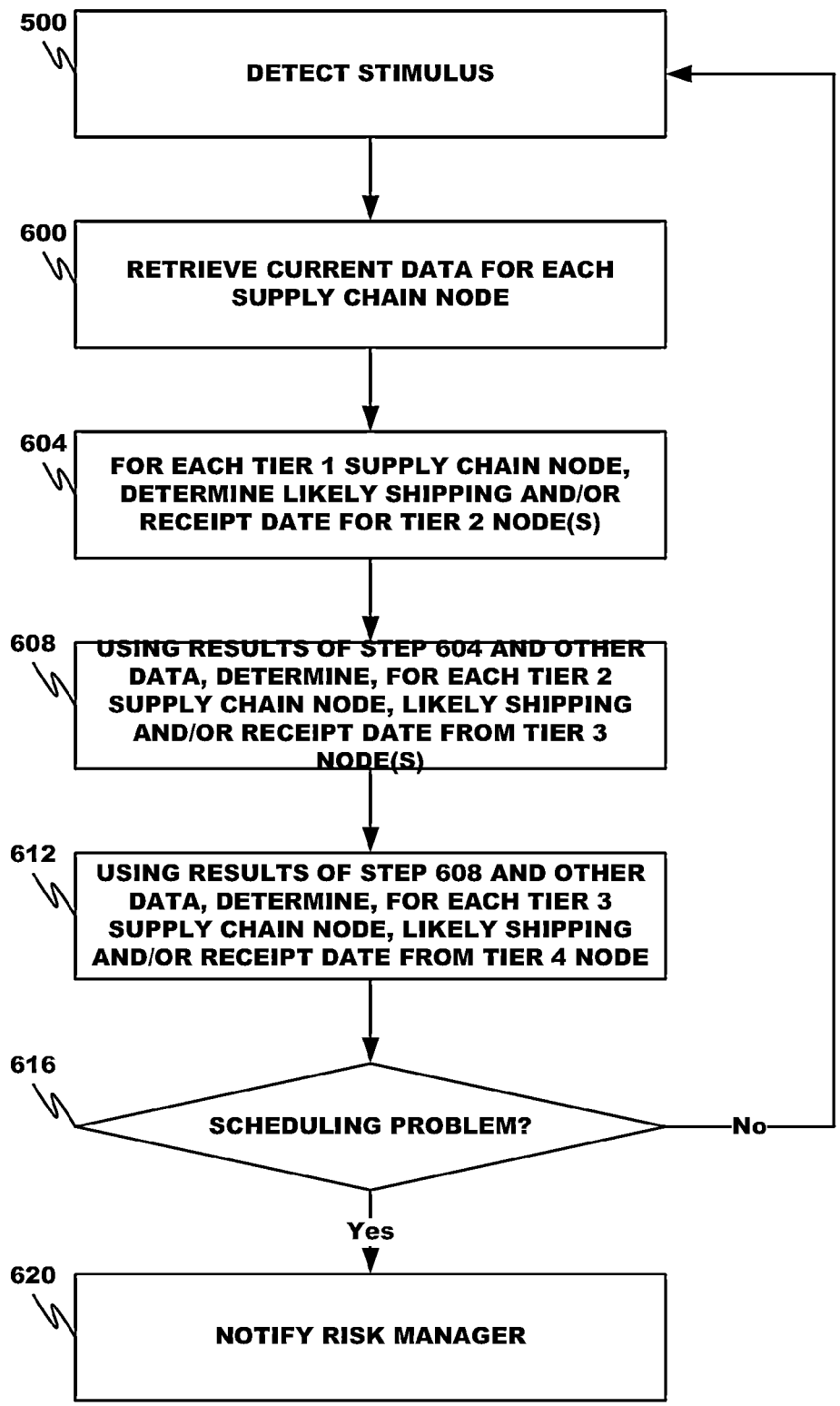
FIG. 6 is a flow chart of an exemplary analytical module.

Referring to FIG. 5, the operation of the scheduling module 304 will be discussed.

In step 500, the scheduling module 304 receives a stimulus. Stimuli include, for example, a request from a tier 1 manager, notification by the data collection module 300 of newly received and/or updated reported performance information, a request from the risk manager 316 and/or analytical engine 312, passage of time, and the like.

In step 504, the scheduling module 304 updates supply chain node-supplied scheduling information, or product delivery estimates, based on the reported performance information and/or the internally generated product delivery estimates. The scheduling information includes, for example, projected shipment arrival dates for products from the tier 2 product assembler 104 and required shipment departure dates for branded products to customers, wholesalers, and/or retailers. Each of the shipment arrival and departure dates can be linked to a set of data structures describing the shipment, including shipment source and destination, freight carrier, freight tracking information, current shipment status, shipment contents (by product type and number), date of shipment, and the like).

In step 508, the scheduling module 304 updates the delivery commitment material and/or part and/or component and/or product scheduling information based on distribution chain performance or scheduling information, supply chain requirements, and/or projections.

In decision diamond 512, the scheduling module 304 compares the results of steps 504 and 508 and determines whether there is a product delivery scheduling problem.

When there is a scheduling problem, the scheduling module 304, in step 516, notifies the risk manager.

When no scheduling problem exists, the scheduling module 304 updates the database and returns to step 500 to await the next stimulus instance.

Figure 7:
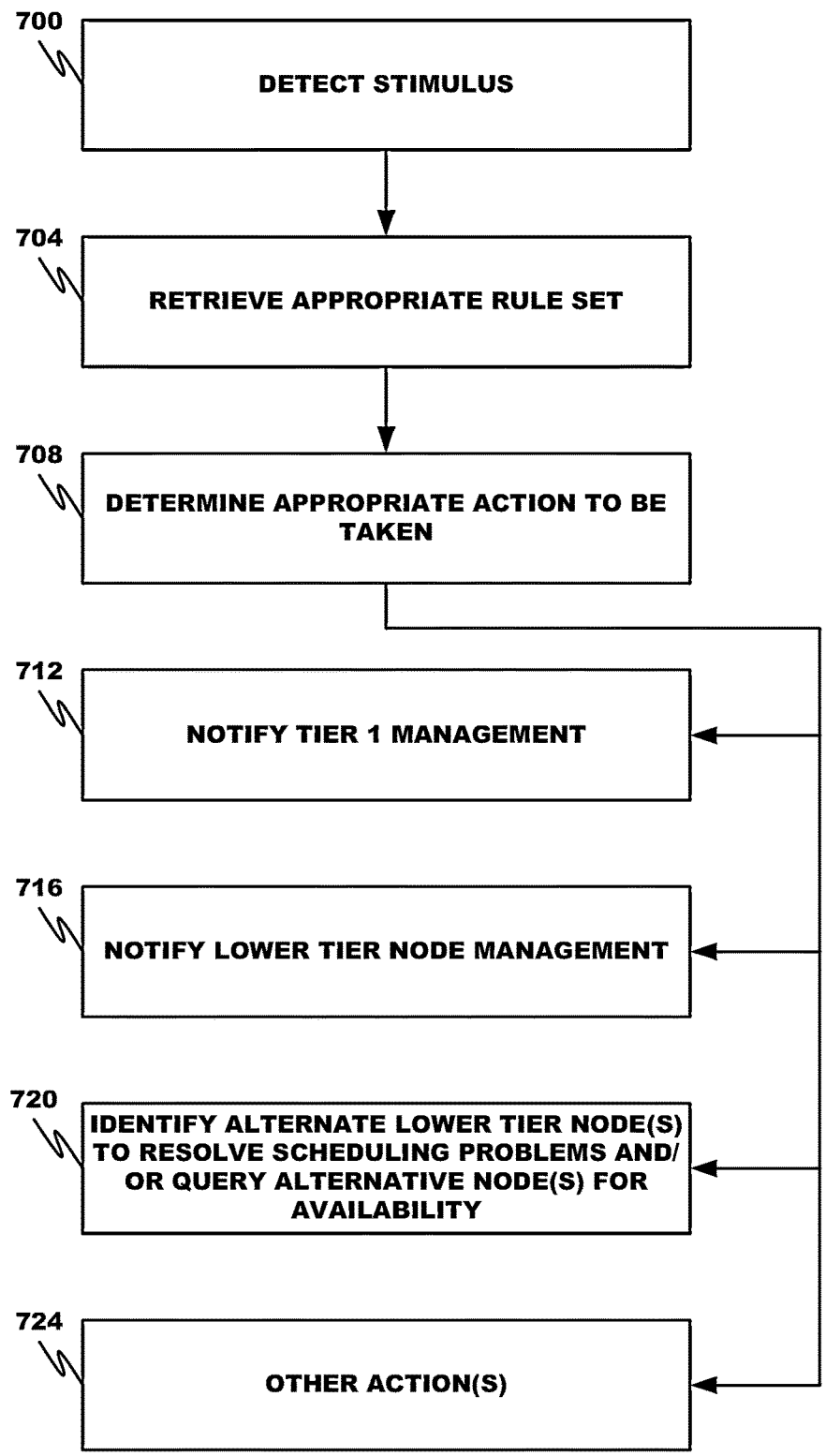
FIG. 7 is a flow chart of an exemplary risk manager.

FIG. 7 depicts operation of the analytical engine.

Upon detection of stimulus in step 500, the analytical engine, in step 600, retrieves current performance data for each supply chain node.

In step 604, the analytical engine, for each tier 1 supply chain node or facility, determines a likely product shipping and/or receipt date from each tier 2 node or facility.

In step 608, the analytical engine, using the results of step 604 and other data, determines, for each tier 2 supply chain node, a likely component shipping and/or receipt date from each tier 3 node or facility.

In step 612, the analytical engine, using the results of step 608 and other data, determines, for each tier 3 supply chain node, a likely component shipping and/or receipt date from each tier 4 node or facility.

In step 616, the analytical engine 312 compares the results of steps 604, 608 and 612 and determines whether there is a material and/or part and/or component and/or product delivery scheduling problem at any tier. As will be appreciated, a material and/or part and/or component and/or product delivery scheduling problem is not limited to material and/or part and/or component and/or product delivery shortfalls relative to distribution chain demands or requirements. A material and/or part and/or component and/or product delivery scheduling problem can also exist when too much product inventory is on hand at a tier 1 facility. In that event, supply chain requirements may need to be decreased to delay or reduce material and/or part and/or component and/or product delivery. This determination can be made by comparing on-hand product inventory to distribution chain demands or requirements. When at least a first threshold level but no more than a second threshold level of inventory is on hand (after projected product delivery), a correct inventory level is present at a tier 1 facility. When more than the second threshold level of inventory is on hand (after projected product delivery), an over-inventory condition exists and a modification to the supply chain requirements is appropriate.

When there is a scheduling problem, the analytical engine, in step 620, notifies the risk manager.

When no scheduling problem exists, the analytical engine updates the database and returns to step 500 to await the next stimulus instance.

FIG. 7 depicts the operation of the risk manager.

In step 700, the risk manager receives a stimulus. Stimuli include, for example, a request from a tier 1 manager, a notification received from the analytical engine, passage of time, and the like. When necessary, the risk manager queries the analytical engine for an analysis of performance information.

In step 704, the risk manager retrieves the appropriate rule or policy set or template from the database.

In step 708, the risk manager determines, based on a comparison of the material and/or part and/or component and/or product delivery scheduling problem with the appropriate rule or policy set or template, an appropriate action to be taken.

A first appropriate action 712 is to notify tier 1 management of the material and/or part and/or component and/or product delivery scheduling problem.

A second appropriate action 716 is to notify management of each of the responsible lower tier node(s) of the product delivery scheduling problem and request a proposed mitigation measure to obviate the material and/or part and/or component and/or product delivery scheduling problem.

A third appropriate action 720 is to identify an alternate lower tier node(s) to resolve the material and/or part and/or component and/or product delivery scheduling problem and/or query an alternative node(s) for availability in assisting in mitigating and/or rectifying the material and/or part and/or component and/or product delivery scheduling problem. For example, an alternative facility of a tier partner can be queried to assist in increasing or decreasing production to mitigate and/or rectify the product delivery scheduling problem at a companion facility of the tier partner. An alternative tier partner can be queried to assist in increasing or decreasing production to mitigate and/or rectify the material and/or part and/or component and/or product delivery scheduling problem at a competitive tier partner.

Other appropriate action(s) 724 include providing a recommendation to tier 1 management of mitigation measure(s) to address and/or rectify the material and/or part and/or component and/or product delivery scheduling problem, a combination of any of the foregoing actions, ship on-hand product inventory from a different tier 1 facility to the demand chain partner, and the like.

Multi-Supply Chain Management System

Figure 8:
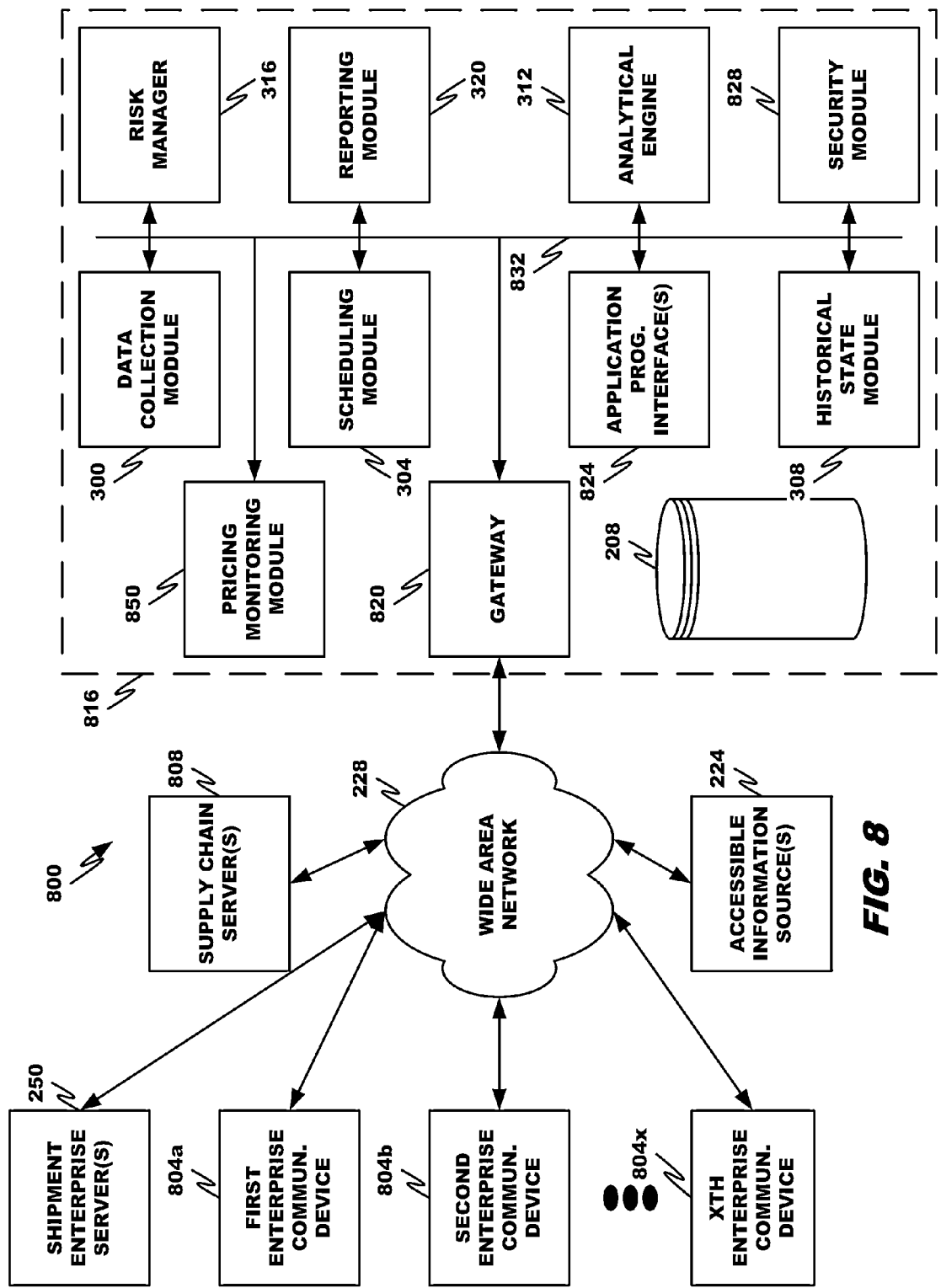
FIG. 8 is a block diagram of an exemplary supply chain management system.

With reference to FIG. 8, a multi-supply chain management system 800 is depicted. The system 800 includes first, second, . . . xth communication devices 804a-x, shipment enterprise and/or organization server(s) 250, supply chain server(s) 808, the accessible information source(s) 812, shipment enterprise and/or organization server 250, and supply chain management platform 816, interconnected by the wide area network 228.

The first, second, . . . xth communication devices 804a-x can be personal communication devices, such as laptops, personal computers, tablet computers, personal digital assistants, and cellular phones, and/or enterprise or organization communication devices, such as servers.

The supply chain server(s) correspond to multiple different and independent supply chains. Each supply chain includes, with reference to FIG. 1, a tier 1 control tower 100 and accompanying server 204, tier 2 assembler 104 and accompanying server 212, first, second, . . . nth tier 3 part/component manufacturer 108a-n and accompanying servers 216a-n, and first, second, third, . . . mth tier 4 material supplier 112a-m and accompanying servers 220a-m.

The supply chain management platform 816 comprises not only the data collection module 300, risk manager 316, scheduling module 304, reporting module 320, analytical engine 312, and historical state module 308 but also a gateway 820, application programming interface(s) 824 (one of which typically corresponds to each of the data collection module 300, risk manager 316, scheduling module 304, reporting module 320, analytical engine 312, and historical state module 308), security module 828, and pricing monitoring module 850. All of the components are interconnected by a trusted local area network 832.

The gateway 820 is a network point (e.g., a router) that acts as an entrance to the local area network 832. The gateway node can also act as a proxy server and/or a firewall to provide security to the local area network 832.

The application programming interface(s) 824 define or specify how software components interact with one another. Typically, each API is a library that includes specification for routines, data structures, object classes, and variables. The API may be implemented in a procedural language or object-oriented language. An API specification can take many forms, including an International Standard such as POSIX, vendor documentation such as the Microsoft Windows™ API and/or the libraries of a programming language, e.g., Standard Template Library in C++ or Java API. An API differs from an application binary interface (ABI) in that an API is source code based while an ABI is a binary interface. The data collection module 300, risk manager 316, scheduling module 304, reporting module 320, analytical engine 312, and historical state module 308 commonly use a common API or different APIs that are configured substantially the same. Generally, all internal and external signaling, including inter-application, intra-application, and/or inter-device messages, pass through APIs.

The security module 828 enforces access privileges and thereby maintains data security for each enterprise, organization, and supply chain. This can be important as supply chains of competitors may be simultaneously using the platform 816 for supply chain management.

The security module 828 can employ a variety of techniques.

One technique is application-based, which determines whether the user has permission to access one or more of the data collection module 300, risk manager 316, scheduling module 304, reporting module 320, analytical engine 312, and historical state module 308. This can be determined using licensing techniques, whereby the user is subjected to access and/or feature restrictions depending on payments made to the platform operator.

Another technique is API-based, which determines whether the user has permission to access one or more of the APIs. Although the user may be licensed to use an application, he or she may not be licensed or privileged to use one or more APIs within that application. Permission can also be determined using licensing techniques, whereby the user is subjected to access and/or feature restrictions depending on payments made to the platform operator, or enforcement of privileges. The query, command, and/or request is typically further required to conform to the requirements of the application programming interface and, when the query, command, and/or request fails to conform to the requirements of the application programming interface, the security module can deny the query, command, and/or request even though the requestor has permission to use the API.

Another technique is data entity or role-based, whereby specified roles can create, read, update, and delete specified objects. For example, a system 816 administrator role can create, read, update and delete enterprise and/or organization, administrator, organization, site, item, and user objects. An administrator for an enterprise and/or organization in a particular supply chain, by contrast, can create, read, update, and delete administrators, users, organizations, sites, and items but only for the particular enterprise and organization. An event manager for an enterprise and/or organization can create site, item, item-site relationships, item-item relationships, and supply chain events but only for the particular enterprise and organization.

Yet another technique is field level-based, which determines whether or not the user has permission to view or change the field. This technique can also be role-based.

In either of the data entity or field level-based techniques, data objects can have different states (e.g., a purchase order can have different states) and be viewed as state machines, whereby a state of a data object is changed by an action. Stated another way, actions cause transitions between states. Each state has a collection of actions that are allowed and permissions associated with performing an action. States can have sub-states for a particular role type. For example, a seller may have a requirement to approve a sell price by a manager before committing the order. Basically, all actions can update an artifact except the first one (create). When an update or delete request is received, the security module or API checks the permissions for the state. When permitted, the update is executed and the artifact assigned a next state or the artifact deleted.

Yet another technique is to control the structure of, or restructure, database queries, commands or requests to comply with relevant sets of permissions. A requestor can write any database query, command, or request desired. The security module receives and applies a security definition to the query, command, or request. If required, the security module edits the query, command, or request consistent with the security definition. The revised or restructured query, command, or request is then passed onto the API of the data collection module. By way of example, assume that there are two supply chains, with the tier 1 control tower on one supply chain being associated with Hewlett Packard™ laptops and the tier 1 control tower on the other supply chain being associated with Dell™ laptops. They each share a common tier 3 component manufacturer, namely Intel™, which supplies integrated circuit boards to each supply chain. A Dell employee provides the following query to the platform 800:

Q: Select * from order where Seller=* and Buyer=*, where "*" is a wildcard.

This query, if executed, would provide the Dell™ employee with all rows and fields in both the Hewlett Packard™ and Dell™ supply chains. To provide the Dell employee with the supply chain information to which he or she is entitled, the security module can restructure the query as follows:

Q: Select * from order where Seller=Dell or Buyer=Dell.

This query provides the requestor with only rows and fields in which Dell is either seller or buyer. Because Intel™ is common to both supply chains, the following query "Q: Select * from order where Seller=Intel or Buyer=Intel will retrieve rows and fields from both supply chains in which Intel is either seller or buyer. In this manner, the security module can implement both row-based and field-based access restrictions, in a readily scalable format, without requiring users associated with enterprises and organizations in the supply chain to voluntarily restrict database queries, commands, and requests in accordance with a particular grammar or language.

While the security module is discussed with reference to information involving only a particular enterprise or organization, it is to be understood that the enterprises and organizations within a supply chain can agree to provide information to other enterprises and organizations located upstream of downstream in the supply chain, such as to the tier 1 control tower. In such cases, the security definition takes such expanded information access into consideration.

The security module can enable the collected information to be maintained in one data location (and common database) without the use of a partitioned database. In other words, the database is not partitioned logically (horizontally or vertically) into distinct and independent parts corresponding to different monitored supply chains, and the data and/or data structures for different monitored supply chains can be commingled and/or conform to a common data model in the database. This can enable the use of a simpler data model that enables ease of constructing relationships between enterprises and organizations, provide stability, and provide scalability. Each data row of the model can have a different schema. The data model can also enable sharing of information across and among different supply chains.

The pricing monitoring module 850 monitors long term contract and spot market prices on materials and/or parts and/or components and/or products and generates alarms or notifications when the monitored prices change upwards or downwards beyond specified thresholds. This can be done effectively by identifying all materials and/or parts and/or components within a selected product. For example, a bill of materials can provide visibility into the various materials and/or parts and/or components of a selected product. An integrated circuit board, for instance, includes a broad number of raw materials, such as silicon, dopants, conductive metals for traces and other conductive structures, and device subcomponents, such as microprocessors, memory modules, etc., and is itself a device used in many end products. The pricing module 850 would monitor prices not only for the raw materials but also for the subcomponents and the device itself. Sudden changes in raw materials prices can provide an advance indication of price changes in the device. This can be used by the pricing monitoring module 850 not only to estimate the resulting device price but also indicate to administrators that additional inventory of the device should be acquired before the price changes. An example of a price estimation algorithm is to determine how much of the raw material is used in the device and the net total increase in cost for the device manufacturer. This net cost increase can be added to the current price to provide a fairly reliable cost estimate.

The analytical engine 320 can also calculate and update performance measures as information is collected by the data collection module 300. In other words, the calculation and updating of performance measures is done substantially in real time. Alternatively, the analytical engine 320 can calculate the performance measures when and as requested by a user. In other words, the performance measures are not precalculated. This can obviate the need for an analytics database altogether.

Operation of the Security Module 828

Figure 9:
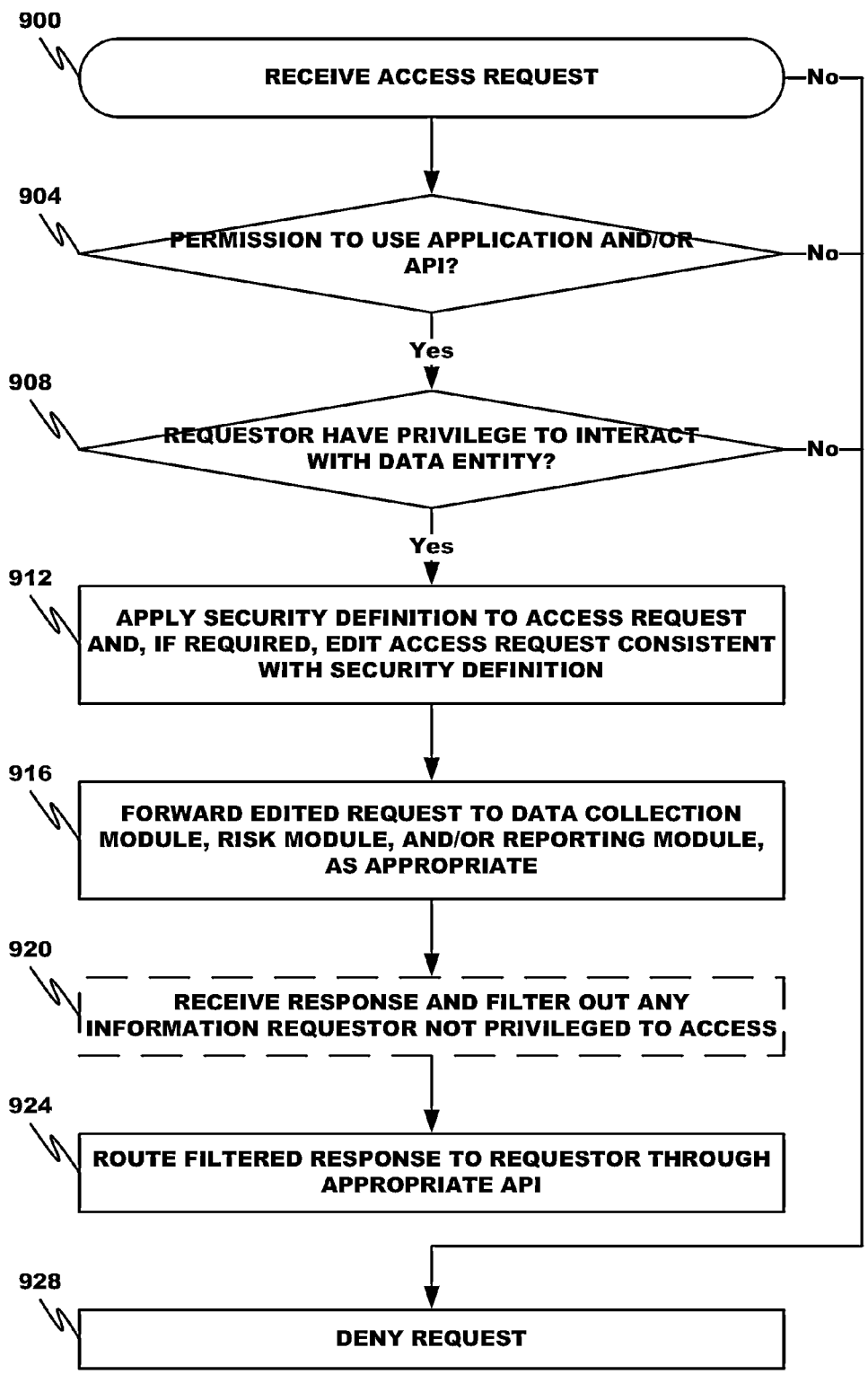
FIG. 9 is a flow chart of an exemplary security module.

With reference to FIG. 9, the operation of the security module 828 will be discussed.

In step 900, the supply chain management platform 816 receives an access request, such as a query, command, or request. The access request can be from a platform administrator or user or from an administrator or member of an enterprise or organization in a supply chain monitored by the platform 816 (hereinafter "requestor").

The security process begins in decision diamond 904, in which the security module 828 determines whether the requestor has permission to use the application to which the access request is directed and the API associated with the application or function or feature of the application to process the access request.

When the requestor has permission to use the application and API, the security module 828, in decision diamond 908, determines whether the requestor is privileged to interact with the data entity. As noted, this query determines whether the requestor has a specified role privileged to create, read, update, and delete the specified data object.

When the requestor does not have permission to use either the application or the specific API of the application involved in processing the access request or is not privileged to interact with the data entity or object, the security module 828 proceeds to step 928 and denies the request.

When the requestor is privileged to interact with the data entity or object, the security module 828 proceeds to step 912 and applies a security definition to the access request and, if required, edits or reconfigures the access request consistent with the applied security definition.

In step 916, the security module 828 forwards the edited request to the application, e.g., the data collection module 300, risk manager 316, scheduling module 304, reporting module 320, analytical engine 312, and/or historical state module 308, for processing.

In optional step 920, the security module 828 receives the response and filters out any information that the requestor is not privileged to access. This is a precautionary step in the event that a database error has caused information to be retrieved improperly.

In step 924, the security module 828 routes the response to the requestor optionally through the appropriate API.

Operation of the Pricing Monitoring Module 850

Figure 10:
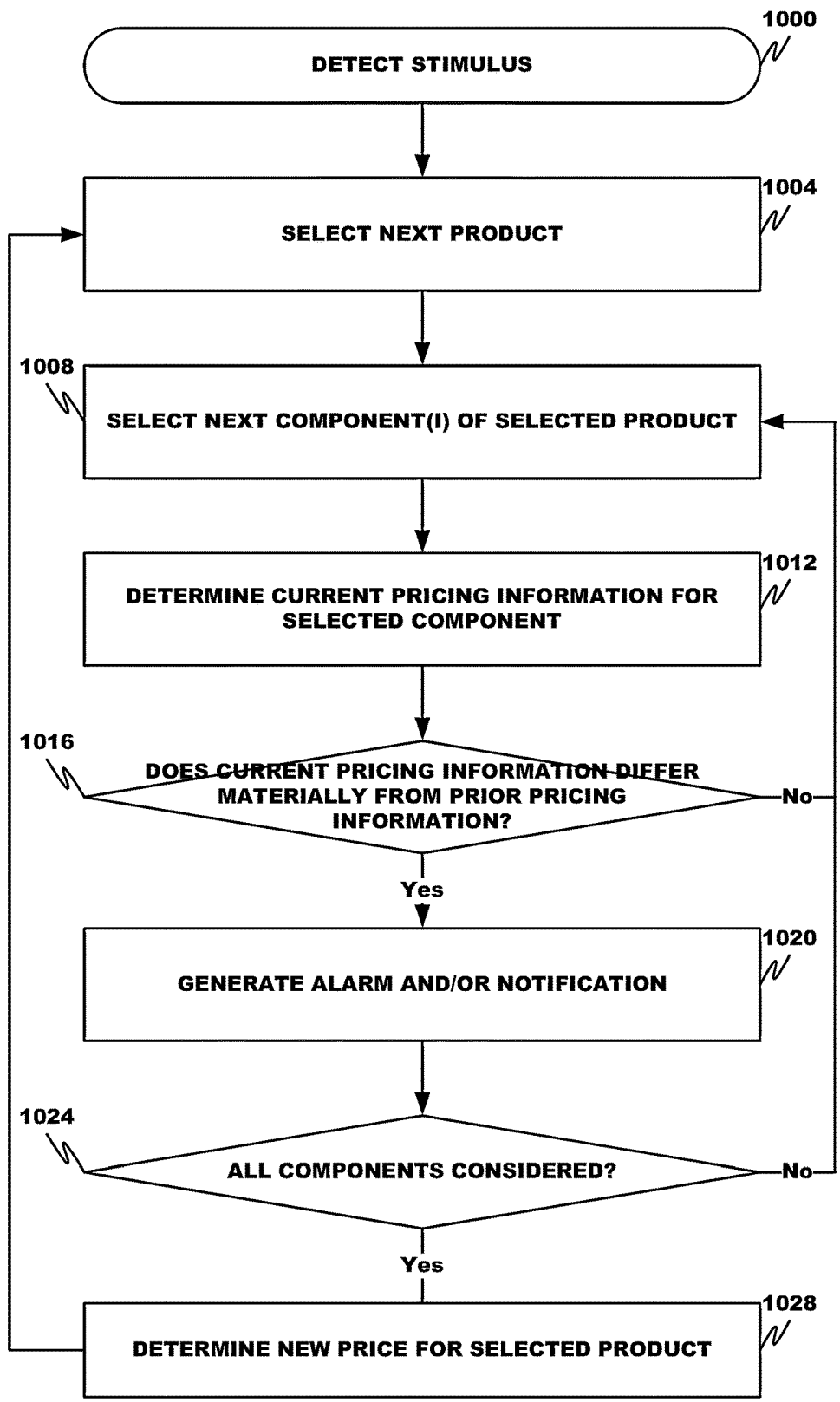
FIG. 10 is a flow chart of an exemplary pricing monitoring module.

The operation of the pricing monitoring module 850 will now be discussed with reference to FIG. 10.

In step 1000, the pricing monitoring module 850 detects a stimulus. The stimulus can be, for example, expiration of a selected time period.

In step 1004, the pricing monitoring module 850 selects a next product for consideration. This step can be done on a supply chain-by-supply chain basis and, for a given supply chain, for one or more selected enterprises or organizations within the supply chain. For example and with reference to FIG. 1, the product can be a product sold by one or more of a tier 1 control tower server 204, tier 2 assembler server 212, first, second, . . . nth tier 3 component manufacturer server 216*a-n*, and first, second, third, . . . mth tier 4 material supplier server 220*a-m*.

In step 1008, the pricing monitoring module 850 selects a next component (I) of the selected product. As noted, the component can be a raw or processed material, formulation, device, or other component.

In step 1012, the pricing monitoring module 850 determines a current pricing information for the selected component. This is typically done using one or more accessible information source(s) 224, such as by browsing the Web.

In decision diamond 1016, the pricing monitoring module 850 determines whether the current pricing information for the selected component differs materially from a previously determined or currently realized pricing for the component. "Materially" is typically determined by one or more thresholds. If the price rises or falls in excess of a predetermined threshold, the pricing change is deemed to be material.

When a price change is material, the pricing monitoring module 850, in step 1020, generates an alarm and/or notification to an administrator of the pertinent enterprise and/or organization.

In decision diamond 1024, the pricing monitoring module 850 determines whether all components for the selected product have been considered.

When there is no material pricing change (decision diamond 1016) or all components have not been considered, the pricing monitoring module 850 returns to step 1008 and selects a next component for pricing analysis.

When all components have been considered, the pricing monitoring module 850, in step 1028, determines a new price for the selected product.

The pricing monitoring module 850 then returns to step 1004 and selects a next product for analysis.

The pricing monitoring module 850 and analytical engine can determine a financial impact on a supplier of the product and/or downstream user of the product. The financial impact analysis can be done for the selected product or across all product lines of the supplier and/or downstream user and/or for the supply chain as a whole.

The exemplary systems and methods of this disclosure have been described in relation to a computer network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the techniques discussed herein are applied to animate objects, such as processing people, particularly at a check point. The Department of Homeland Security can use the management systems to process people more effectively at airport security checkpoints and the Immigration and Naturalization Service can use the management systems to process more effectively at border crossings.

In another alternative embodiment, the techniques discussed herein can be applied to inanimate objects, such as mail or packages, such as by a postal, courier or freight service.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a supply chain comprising a plurality of supply chain components including at least a tier 1 control tower, tier 2 product assembler, tier 3 part or component manufacturer, and tier 4 material supplier, each of the tier 1 control tower, tier 2 product assembler, tier 3 part or component manufacturer, and tier 4 material supplier being associated with a different and independent enterprise or organization, a supply chain monitoring system comprising:
 a microprocessor;
 a non-transitory computer readable medium, coupled to the microprocessor, comprising a microprocessor executable data collection module that programs the microprocessor to:
  collect, via an intermediate network, performance information from a server associated with each of the tier 1 control tower, tier 2 product assembler, tier 3 part or component manufacturer, and tier 4 material supplier to monitor a performance of one or more functions of the supply chain;
  obtain event information regarding a disruptive event, wherein the disruptive event is not indicated in the collected performance information but adversely impacts performance of one or more supply chain components of the plurality of supply chain components;
  determine a spatial range of disruption of the disruptive event based on the event information;
  compare the spatial range of disruption of the disruptive event against a topology of at least a portion of the supply chain;

determine a probability that a supply chain component of the at least a portion of the supply chain will be impacted by the disruptive event based on the comparing of the spatial range of disruption of the disruptive event against the topology of the at least a portion of the supply chain, wherein the supply chain component is one or more of a facility of the tier 1 control tower, tier 2 product assembler, tier 3 part or component manufacturer, or tier 4 material supplier and a material, component, part, or product shipment;

provide one or more recommendations to mitigate the disruptive event, the one or more recommendations comprising recommended changes to the supply chain, the recommended changes to the supply chain comprising restructuring relationships between tier 1, 2, 3 and 4 entities;

perform the one or more recommended changes to the supply change to mitigate the disruptive event; and provide scheduling information for a selected shipment, including a projected shipment arrival date or required shipment departure date, the scheduling information being linked to a set of data structures describing the shipment, the set of data structures comprising one or more of shipment source or destination, freight carrier, freight tracking information, current shipment status, shipment contents, and date of shipment, wherein moving a cursor over the range of disruption a box causes the microprocessor to provide event information comprising one or more of a description or location of the event, a number of parts or products impacted by the event, a financial impact of the event, and facilities affected by the event.

2. The supply chain monitoring system of claim 1, wherein the performance information comprises a plurality of manufactured item output projections over a specified time period, production facility sizes or locations, raw material, work-in-process, manufactured part or component or product inventory levels, order cycle times, days of supply in inventory, manufacturing resource type, availability, reliability, or productivity, unit operations, financial factors, number of on time shipments, number of late shipments, order mismatch count, service quality, repair cost per unit, inventory value, transaction documents associated with a material or part or component or product of one or more of the tier 1 control tower, tier 2 product assembler, tier 3 part or component manufacturer, and tier 4 material supplier, historic, current, or projected compliance with price, supply requirements, or other material terms, historic, current, or projected material or part or component or product output levels, and mean, median, average, mode, historic, or projected freight transportation times, delays, or requirements and further comprising, in the computer readable medium:

a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event.

3. The supply chain monitoring system of claim 1, wherein the computer readable medium further comprises data structures describing a role for each enterprise or organization associated with the tier 1 control tower, tier 2 product assembler, tier 3 part or component manufacturer, and tier 4 material supplier and one or more associated enterprises or organizations in the supply chain to indicate a contractual or other supply relationship and a plurality of a geographical or geopolitical location of each enterprise or organization associated with the tier 1 control tower, tier 2 product assembler, tier 3 part or component manufacturer, and tier 4 material supplier, material or part or component or product type or identity supplied by the enterprise or organization, current spot market or contractual sales price of the material or part or component or product type supplied by the enterprise or organization, respective performance metrics of the enterprise or organization, material or part or component or product supply or purchase commitment with another enterprise or organization in the supply chain, specifications and requirements for materials or parts or components or products supplied or purchased by the enterprise or organization, material or part or component or product quantity and shipment dates and expected arrival dates at the next enterprise or organization in the supply chain, order cycle or turnaround times, shipment or order volume, total number of shipments, number of on time shipments, number of late shipments, and order mismatch count and further comprising, in the computer readable medium:

a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is a natural disaster event.

4. The supply chain monitoring system of claim 1, wherein the data collection module obtains shipment information from one or more servers associated with a freight enterprise or organization handling a shipment between enterprises or organizations in the supply chain and further comprising, in the computer readable medium:

a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is one or more of a storm, typhoon, hurricane, cyclone, tornado, wind, blizzard, tsunami, volcanic eruption, fire, flood, avalanche, and landslide.

5. The supply chain monitoring system of claim 1, wherein the event information is obtained from a server associated with one or more of a news source, a news aggregator, a weather data source, a governmental entity, a law enforcement authority, and a military authority and wherein the microprocessor determines the range of disruption using a shape file.

6. The supply chain monitoring system of claim 1, wherein the computer readable medium further comprises:
a microprocessor executable historical state module operable to maintain historical information tracking past performance for a plurality of the tier 1 control tower, tier 2 product assembler, tier 3 part or component manufacturer, and tier 4 material supplier and, based on the past performance, assign a level of confidence in a shipment arriving by a selected date, wherein the one or more of a description or location of the event comprises one or more of an event type, event subtype, event epicenter, country of the event epicenter location, postal code of the event epicenter location, radius impacted by the event, current risk or severity level of the event, and event expiration date or time.

7. The supply chain monitoring system of claim 6, wherein the computer readable medium further comprises:
a microprocessor executable analytical module to receive collected performance information, scheduling information, and historical information and identify a non-compliant event in the supply chain.

8. The supply chain monitoring system of claim 7, wherein the analytical module determines and assigns a supply chain performance rating for each of the tier 2 product assembler, tier 3 part or component manufacturer, and tier 4 material supplier and a likelihood that the non-compliant event will occur.

9. The supply chain monitoring system of claim 7, wherein the computer readable medium further comprises:
a microprocessor executable risk manager to apply a rule, policy, or template to the performance information and provide the one or more recommendations to mitigate the disruptive event, wherein the recommended changes to the supply chain further comprise one or more of ordering products from a different facility, using a type of freight company or specific freight company, cancelling or altering an existing order, shipping product from a different facility, or shipping a different product.

10. The supply chain monitoring system of claim 1, wherein the computer readable medium further comprises:
a reporting module to generate a map display presenting collected performance information to an administrator, the map display comprising a location for each of the tier 2 product assembler, tier 3 part or component manufacturer, and tier 4 material supplier and a shipment route for each of the tier 2 product assembler, tier 3 part or component manufacturer, and tier 4 material supplier and wherein at least one of the location and shipment route comprise a compliance indicator indicating whether the corresponding at least one of the location and shipment route is in compliance with a supply chain performance objective or requirement.

11. In a supply chain comprising a plurality of supply chain components including at least a tier 1 control tower, tier 2 product assembler, tier 3 part or component manufacturer, and tier 4 material supplier, a method comprising:
collecting, by a microprocessor executing a executable data collection module, performance information from a server associated with each of the tier 1 control tower, tier 2 product assembler, tier 3 part or component manufacturer, and tier 4 material supplier to monitor a performance of one or more functions of the supply chain;

obtaining, by the microprocessor, event information regarding a disruptive event, wherein the disruptive event is not indicated in the collected performance information but adversely impacts future performance of one or more supply chain components of the plurality of supply chain components;

determining, by the microprocessor, a spatial range of disruption of the disruptive event based on the event information;

comparing, by the microprocessor, the spatial range of disruption of the disruptive event against a topology of at least a portion of the supply chain;

determining, by the microprocessor, a probability that a supply chain component of the at least a portion of the supply chain will be impacted by the disruptive event based on the comparing of the spatial range of disruption of the disruptive event against the topology of the at least a portion of the supply chain, wherein the supply chain component is one or more of a facility of the tier 1 control tower, tier 2 product assembler, tier 3 part or component manufacturer, or tier 4 material supplier and a material, component, part, or product shipment;

providing, by the microprocessor, one or more recommendations to mitigate the disruptive event, the one or more recommendations comprising recommended changes to the supply chain, the recommended changes to the supply chain comprising restructuring relationships between tier 1, 2, 3 and 4 entities;

performing, by the microprocessor, the one or more recommended changes to the supply change to mitigate the disruptive event; and providing, by the microprocessor, scheduling information for a selected shipment, including a projected shipment arrival date or required shipment departure date, the scheduling information being linked to a set of data structures describing the shipment, the set of data structures comprising one or more of shipment source or destination, freight carrier, freight tracking information, current shipment status, shipment contents, and date of shipment, wherein moving a cursor over the range of disruption a box causes the microprocessor to provide event information comprising one or more of a description or location of the event, a number of parts or products impacted by the event, a financial impact of the event, and facilities affected by the event.

12. The method of claim 11, wherein each of the tier 1 control tower, tier 2 product assembler, tier 3 part or component manufacturer, and tier 4 material supplier is associated with a different and independent enterprise or organization, wherein the performance information comprises a plurality of manufactured item output projections over a specified time period, production facility sizes or locations, raw material, work-in-process, manufactured part or component or product inventory levels, order cycle times, days of supply in inventory, manufacturing resource type, availability, reliability, or productivity, unit operations, financial factors, number of on time shipments, number of late shipments, order mismatch count, service quality, repair cost per unit, inventory value, transaction documents associated with a material or part or component or product of one or more of the tier 1 control tower, tier 2 product assembler, tier 3 part or component manufacturer, and tier 4 material supplier, historic, current, or projected compliance with price, supply requirements, or other material terms, historic, current, or projected material or part or component or product output levels, and mean, median, average, mode, historic, or projected freight transportation times, delays, or requirements and further comprising:

generating and providing for display, by the microprocessor executing a reporting module, a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event.

13. The method of claim 11, further comprising:

maintaining, by the data collection module, data structures describing a role for each enterprise or organization associated with the tier 1 control tower, tier 2 product assembler, tier 3 part or component manufacturer, and tier 4 material supplier and one or more associated enterprises or organizations in the supply chain to indicate a contractual or other supply relationship and a plurality of a geographical or geopolitical location of each enterprise or organization associated with the tier 1 control tower, tier 2 product assembler, tier 3 part or component manufacturer, and tier 4 material supplier, material or part or component or product type or identity supplied by the enterprise or organization, current spot market or contractual sales price of the material or part or component or product type supplied by the enterprise or organization, respective performance metrics of the enterprise or organization, material or part or component or product supply or purchase commitment with another enterprise or organization in the supply chain, specifications and requirements for materials or parts or components or products supplied or purchased by the enterprise or organization, material or part or component or product quantity and shipment dates and expected arrival dates at the next enterprise or organization in the supply chain, order cycle or turnaround times, shipment or order volume, total number of shipments, number of on time shipments, number of late shipments, and order mismatch count and further comprising:

generating and providing for display, by the microprocessor executing a reporting module, a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is a naturally occurring event.

14. The method of claim 11, wherein the data collection module obtains shipment information from one or more servers associated with a freight enterprise or organization handling a shipment between enterprises or organizations in the supply chain and further comprising:

generating and providing for display, by the microprocessor executing a reporting module, a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is one or more of a weather event and a natural disaster.

15. The method of claim 11, wherein the data collection module obtains event information regarding events adversely impacting performance of the supply chain and wherein the event information is obtained from a server associated with one or more of a news source, a news aggregator, a weather data source, a governmental entity, a law enforcement authority, and a military authority and wherein the microprocessor determines the range of disruption using a shape file.

16. The method of claim 11, further comprising:

maintaining, by a microprocessor executable historical state module, historical information tracking past performance for a plurality of the tier 1 control tower, tier 2 product assembler, tier 3 part or component manufacturer, and tier 4 material supplier and, based on the past performance, assigning a level of confidence in a shipment arriving by a selected date, wherein the one or more of a description or location of the event comprises one or more of an event type, event subtype, event epicenter, country of the event epicenter location, postal code of the event epicenter location, radius impacted by the event, current risk or severity level of the event, and event expiration date or time.

17. The method of claim 16, further comprising:

receiving, by a microprocessor executable analytical module, collected performance information, scheduling information, and historical information and identifying a noncompliant event in the supply chain.

18. The method of claim 17, wherein the analytical module determines and assigns a supply chain performance rating for each of the tier 2 product assembler, tier 3 part or component manufacturer, and tier 4 material supplier and a likelihood that the noncompliant event will occur.

19. The method of claim 17, further comprising:

applying, by a microprocessor executable risk manager, a rule, policy, or template to the performance information to generate the one or more recommendations to mitigate the disruptive event, wherein the recommended changes to the supply chain further comprise one or more of ordering products from a different facility, using a type of freight company or specific freight company, cancelling or altering an existing order, shipping product from a different facility, or shipping a different product.

20. The method of claim 11, further comprising:

generating, by a reporting module, a map display presenting collected performance information to an administrator, the map display comprising a location for each of the tier 2 product assembler, tier 3 part or component manufacturer, and tier 4 material supplier and a shipment route for each of the tier 2 product assembler, tier 3 part or component manufacturer, and tier 4 material supplier and wherein at least one of the location and shipment route comprise a compliance indicator indicating whether the corresponding at least one of the location and shipment route is in compliance with a supply chain performance objective or requirement.

21. A supply chain monitoring system comprising:
a microprocessor;
a non-transitory computer readable medium, coupled to the microprocessor, comprising a microprocessor executable data collection module that programs the microprocessor to:
collect, via an intermediate network, performance information from a server associated with the supply chain, the supply chain comprising a plurality of supply chain components including at least a tier 1 control tower, tier 2 product assembler, tier 3 part or component manufacturer, and tier 4 material supplier to monitor a performance of one or more functions of a supply chain comprising the tier 1 control tower, tier 2 product assembler, tier 3 part or component manufacturer, and tier 4 material supplier;
obtain event information regarding a disruptive event, wherein the disruptive event is not indicated in the collected performance information but adversely impacts future performance of one or more supply chain components of the plurality of supply chain components;
determine a spatial range of disruption of the disruptive event based on the event information;
compare the spatial range of disruption of the disruptive event against a topology of at least a portion of the supply chain;
determine a probability that a supply chain component of the at least a portion of the supply chain will be impacted by the disruptive event based on the comparing of the spatial range of disruption of the disruptive event against the topology of the at least a portion of the supply chain, wherein the supply chain component is one or more of a facility of the tier 1 control tower, tier 2 product assembler, tier 3 part or component manufacturer, or tier 4 material supplier and a material, component, part, or product shipment;
provide one or more recommendations to mitigate the disruptive event, the one or more recommendations comprising recommended changes to the supply chain, the recommended changes to the supply chain comprising restructuring relationships between tier 1, 2, 3 and 4 entities; and
perform the one or more recommended changes to the supply change to mitigate the disruptive event; and
provide scheduling information for a selected shipment, including a projected shipment arrival date or required shipment departure date, the scheduling information being linked to a set of data structures describing the shipment, the set of data structures comprising one or more of shipment source or destination, freight carrier, freight tracking information, current shipment status, shipment contents, and date of shipment, wherein moving a cursor over the range of disruption a box causes the microprocessor to provide event information comprising one or more of a description or location of the event, a number of parts or products impacted by the event, a financial impact of the event, and facilities affected by the event.

22. The supply chain monitoring system of claim 21, wherein the tier 1 control tower, tier 2 product assembler, tier 3 part or component manufacturer, and tier 4 material supplier are associated with a different and independent enterprise or organization, wherein the performance information comprises a plurality of manufactured item output projections over a specified time period, production facility sizes or locations, raw material, work-in-process, manufactured part or component or product inventory levels, order cycle times, days of supply in inventory, manufacturing resource type, availability, reliability, or productivity, unit operations, financial factors, number of on time shipments, number of late shipments, order mismatch count, service quality, repair cost per unit, inventory value, transaction documents associated with a material or part or component or product of one or more of the tier 1 control tower, tier 2 product assembler, tier 3 part or component manufacturer, and tier 4 material supplier, historic, current, or projected compliance with price, supply requirements, or other material terms, historic, current, or projected material or part or component or product output levels, and mean, median, average, mode, historic, or projected freight transportation times, delays, or requirements and further comprising, in the computer readable medium:
a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event.

23. The supply chain monitoring system of claim 21, wherein the computer readable medium further comprises data structures describing a role for each enterprise or organization associated with the tier 1 control tower, tier 2 product assembler, tier 3 part or component manufacturer, and tier 4 material supplier and one or more associated enterprises or organizations in the supply chain to indicate a contractual or other supply relationship and a plurality of a geographical or geopolitical location of each enterprise or organization associated with the tier 1 control tower, tier 2 product assembler, tier 3 part or component manufacturer, and tier 4 material supplier, material or part or component or product type or identity supplied by the enterprise or organization, current spot market or contractual sales price of the material or part or component or product type supplied by the enterprise or organization, respective performance metrics of the enterprise or organization, material or part or component or product supply or purchase commitment with another enterprise or organization in the supply chain, specifications and requirements for materials or parts or components or products supplied or purchased by the enterprise or organization, material or part or component or product quantity and shipment dates and expected arrival dates at the next enterprise or organization in the supply chain, order cycle or turnaround times, shipment or order volume, total number of shipments, number of on time shipments, number of late shipments, and order mismatch count and further comprising, in the computer readable medium:
a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is a natural disaster.

24. The supply chain monitoring system of claim 21, wherein the data collection module obtains shipment information from one or more servers associated with a freight enterprise or organization handling a shipment between enterprises or organizations in the supply chain and further comprising, in the computer readable medium:
a reporting module that programs the microprocessor to generate and provide for display a graphical display comprising a map displaying, for the at least a portion of the supply chain, as nodes, locations of the tier 2 product assembler, tier 3 part or component manufacturer, and tier 4 material supplier, and, as lines interconnecting two or more of the nodes, material or part or component or product shipment lines indicating shipping routes, and the range of disruption of the event, wherein a color or shade of each of the shipment lines indicates whether or not the corresponding shipment is on-time or delayed and wherein the event is one or more of a geologic event and an atmospheric event.

25. The supply chain monitoring system of claim 21, wherein the event information is obtained from a server associated with one or more of a news source, a news aggregator, a weather data source, a governmental entity, a law enforcement authority, and a military authority and wherein the microprocessor determines the range of disruption using a shape file.

26. The supply chain monitoring system of claim 21, wherein the computer readable medium further comprises:
a microprocessor executable historical state module operable to maintain historical information tracking past performance for a plurality of the tier 1 control tower, tier 2 product assembler, tier 3 part or component manufacturer, and tier 4 material supplier and, based on the past performance, assign a level of confidence in a shipment arriving by a selected date, wherein the one or more of a description or location of the event comprises one or more of an event type, event subtype, event epicenter, country of the event epicenter location, postal code of the event epicenter location, radius impacted by the event, current risk or severity level of the event, and event expiration date or time.

27. The supply chain monitoring system of claim 26, wherein the computer readable medium further comprises:
a microprocessor executable analytical module to receive collected performance information, scheduling information, and historical information and identify a non-compliant event in the supply chain.

28. The supply chain monitoring system of claim 27, wherein the analytical module determines and assigns a supply chain performance rating for each of the tier 2 product assembler, tier 3 part or component manufacturer, and tier 4 material supplier and a likelihood that the non-compliant event will occur.

29. The supply chain monitoring system of claim 27, wherein the computer readable medium further comprises:
a microprocessor executable risk manager to apply a rule, policy, or template to the performance information to generate the one or more recommendations to mitigate the disruptive event, wherein the recommended changes to the supply chain further comprise one or more of ordering products from a different facility, using a type of freight company or specific freight company, cancelling or altering an existing order, or shipping product from a different facility, shipping a different product.

30. The supply chain monitoring system of claim 21, wherein the computer readable medium further comprises:
a reporting module to generate a map display presenting collected performance information to an administrator, the map display comprising a location for each of the tier 2 product assembler, tier 3 part or component manufacturer, and tier 4 material supplier and a shipment route for each of the tier 2 product assembler, tier 3 part or component manufacturer, and tier 4 material supplier and wherein at least one of the location and shipment route comprise a compliance indicator indicating whether the corresponding at least one of the location and shipment route is in compliance with a supply chain performance objective or requirement.

* * * * *